United States Patent [19]

Tanioka

[11] Patent Number: 4,709,274

[45] Date of Patent: Nov. 24, 1987

[54] IMAGE PROCESSING APPARATUS

[75] Inventor: Hiroshi Tanioka, Tokyo, Japan

[73] Assignee: Canon Kabushiki Kaisha, Tokyo, Japan

[21] Appl. No.: 644,558

[22] Filed: Aug. 27, 1984

[30] Foreign Application Priority Data

| Aug. 29, 1983 | [JP] | Japan | 58-156412 |
| Sep. 1, 1983 | [JP] | Japan | 58-159077 |
| Sep. 1, 1983 | [JP] | Japan | 58-159078 |
| Sep. 19, 1983 | [JP] | Japan | 58-171081 |
| Sep. 22, 1983 | [JP] | Japan | 58-174376 |

[51] Int. Cl.$^4$ .............................................. H04N 1/40
[52] U.S. Cl. ................................... 358/283; 358/280; 358/284; 358/282; 382/50; 382/53
[58] Field of Search ............... 358/280, 283, 284, 298; 382/50, 53; 358/293, 282

[56] References Cited

U.S. PATENT DOCUMENTS

| 4,194,221 | 3/1980 | Stoffel | 358/280 |
| 4,414,581 | 11/1983 | Kato et al. | 358/283 |
| 4,495,522 | 1/1985 | Matsunawa et al. | 358/280 |
| 4,525,747 | 6/1985 | Sakai et al. | 358/282 |

Primary Examiner—Howard W. Britton
Assistant Examiner—John K. Peng
Attorney, Agent, or Firm—Fitzpatrick, Cella, Harper & Scinto

[57] ABSTRACT

An image processing apparatus has a slice binarizing circuit, a dither process circuit, maximum and minimum density measuring circuits, a comparator for determining if each image area is a binary or halftone image area, and a RAM for storing an output from the comparator. An average value of the difference between the maximum and minimum densities can be calculated, and outputs from the slice binarizing circuit and the dither process circuit can be ANDed or ORed in accordance with a comparison result of the average value with a reference value. An image density gradient or image tone data in an image block can also be calculated to allow multi-level quantization and optimal image reproduction.

37 Claims, 33 Drawing Figures

|  | A0 | | | | A1 | | | | A2 |
|---|---|---|---|---|---|---|---|---|---|
| 4n+1ST LINE | 3 | 7 | 10 | 10 | 8 | 9 | 5 | 3 | 2 |
| 4n+2ND LINE | 5 | 6 | 10 | 10 | | | | | |
| 4n+3RD LINE | 8 | 3 | 12 | 15 | | | | | |
| 4n+4TH LINE | 7 | 2 | 0 | 0 | | | | | |
| 4(n+1)+1ST LINE | 20 | | | | | | | | |

| 24 | 28 | 32 | 36 |
|----|----|----|----|
| 20 | 0  | 4  | 40 |
| 16 | 12 | 8  | 44 |
| 60 | 56 | 52 | 48 |

FIG.13(B)

| 26 | 30 | 34 | 38 |
|----|----|----|----|
| 22 | 2  | 6  | 42 |
| 18 | 14 | 10 | 46 |
| 62 | 58 | 54 | 50 |

FIG.13(C)

| 12 | 14 | 16 | 18 |
|----|----|----|----|
| 10 | 0  | 2  | 20 |
| 8  | 6  | 4  | 22 |
| 30 | 28 | 26 | 24 |

FIG.13(D)

| 44 | 46 | 48 | 50 |
|----|----|----|----|
| 42 | 32 | 34 | 52 |
| 40 | 38 | 36 | 54 |
| 62 | 60 | 58 | 56 |

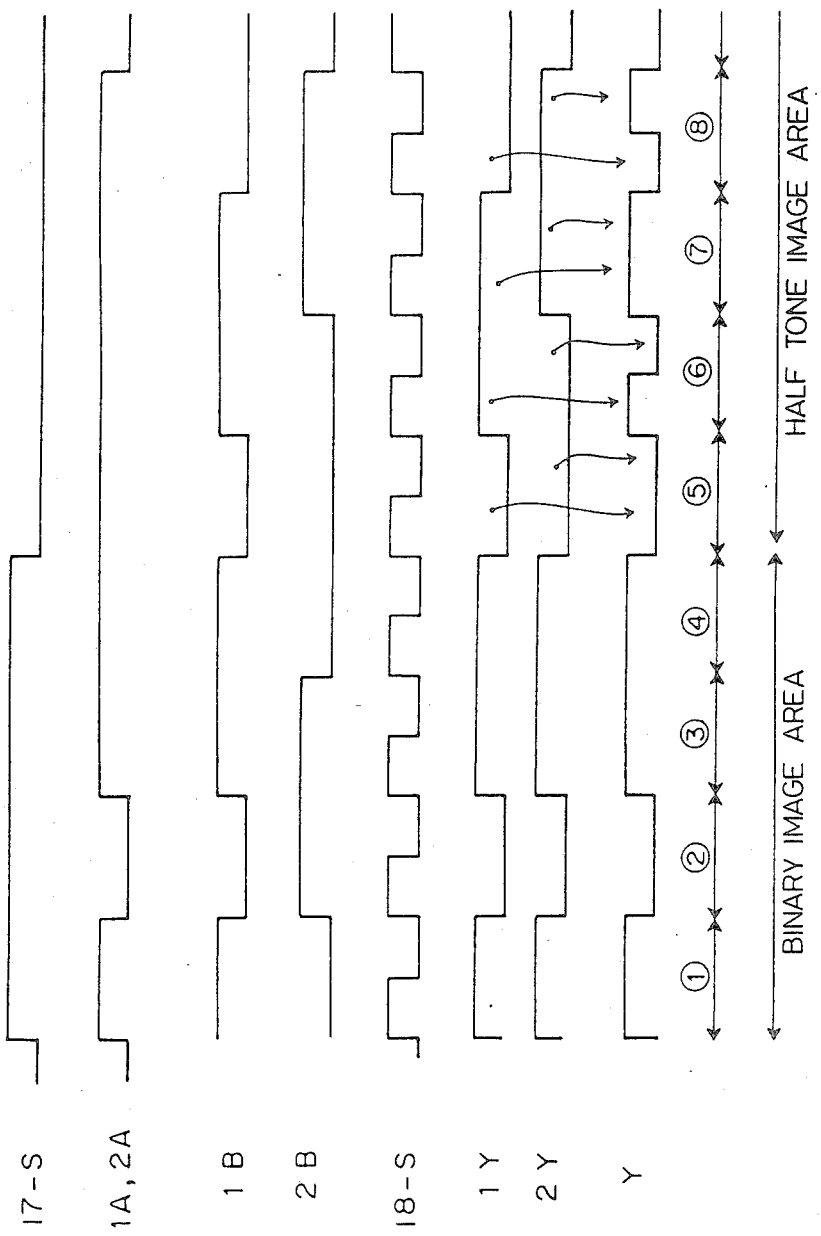

| 24 | 28 | 32 | 36 |
|----|----|----|----|
| 20 | 0  | 4  | 40 |
| 16 | 12 | 8  | 44 |
| 60 | 56 | 52 | 48 |

| 25 | 29 | 33 | 37 |
|----|----|----|----|
| 21 | 1  | 5  | 41 |
| 17 | 13 | 9  | 15 |
| 61 | 57 | 53 | 49 |

| 26 | 30 | 34 | 38 |
|----|----|----|----|
| 22 | 2  | 6  | 42 |
| 18 | 14 | 10 | 46 |
| 62 | 58 | 54 | 50 |

| 27 | 31 | 35 | 39 |
|----|----|----|----|
| 23 | 3  | 7  | 43 |
| 19 | 15 | 11 | 47 |
| 63 | 59 | 55 | 51 |

IMAGE PROCESSING APPARATUS

BACKGROUND OF THE INVENTION

1. Field of the Invention

The present invention relates to an image processing apparatus which can be suitably adapted for an electronic file, a facsimile system, a reader, a digital copying machine or the like.

2. Description of the Prior Art

A conventional image processing apparatus is known which has a slice binarizing or digitizing circuit for binarizing original image data by slicing it at a predetermined threshold level, and a binarizing circuit for performing a pseudo halftone reproduction.

An example of an apparatus of this type has a dither binarizing circuit. The dither binarizing circuit converts an image signal output from a solid-state image pick-up device such as a CCD into digital signals corresponding to pels by a 6-bit A/D converter. The circuit then performs a dither process of the digital signals to thereby perform binarization. In addition to such a dither binarizing circuit, this apparatus has a slice binarizing circuit. The slice binarizing circuit has predetermined threshold levels for a dither matrix and slices the digital signals at these threshold values, thereby performing slice binarization.

In this apparatus, a so-called automatic density control function ordinarily used for a facsimile system is frequently added. According to this automatic density control function, the background of an original image is detected to set a threshold level above the detected background level so as to suppress non-clearness of the reproduced image due to the influence of the background. When this automatic density control function is actually added to the slice binarization function, since each digital image signal corresponds to a pel, the slice binarizing circuit becomes large in size. For this reason, the overall apparatus becomes expensive.

As has been described above, various image processing apparatuses have been proposed which form images using different processing methods in accordance with an image tone of an original. More specifically, when an original has an image which does not include any halftone portion, such as a binary image of black and white including only characters and the like, a slice binarizing method is adopted in which each pel density of the original is compared with a predetermined threshold level (an intermediate level between black and white) to perform binarization. However, when an original is an image including a halftone image portion such as a photograph, the well known dither method is adopted due to economy and effectiveness.

However, originals do not usually contain only characters or photographs but frequently include both photographs and characters. In view of this, an image processing apparatus has been recently proposed which can selectively use the slice process method and the dither method. In this apparatus, while an original image is read, it is discriminated in accordance with a predetermined algorithm if the read original portion is a character image or a photograph image. One of the slice process methods and the dither method are adopted in accordance with the discrimination result obtained so as to form an optimal image.

FIG. 1 is a block diagram showing the configuration of the image processing apparatus of this type. Referring to FIG. 1, a maximum density measuring circuit 1 (to be referred to as a Dmax measuring circuit hereinafter) divides image data VD into unit blocks each consisting of 4×4 pels and calculates a maximum density Dmax for each block. A minimum density measuring circuit 2 (to be referred to as Dmin measuring circuit hereinafter) divides the image data VD into similar blocks as in the circuit 1 and calculates a minimum density Dmin for each block. Each of the Dmax and Dmin measuring circuits 1 and 2 comprises a RAM (not shown) having a capacity of (main scan pel number/4 pels)×(4 or 6 bits), and a comparator (not shown). The image data VD is received from an image reader or the like. A subtracter 3 calculates the difference Dmax - Dmin) for, each block in accordance with the outputs from the Dmax and Dmin measuring circuits 1 and 2. A comparator 4 compares the difference Dmax - Dmin) received from the subtracter 3 with a predetermined reference value Ct. The comparator 4 produces a 1-bit image area discrimination result RE1 which is "1" when the detected image area is a binary image area and is "0" when the detected image area is a halftone image area. Discrimination of an image area is performed when each fourth line scan is completed. A RAM 5 latches the current result RE1 until the next four line scan is completed. The members 3, 4 and 5 constitute a first discriminating means A1. A slice binarizing circuit 6 is a binarizing process means for binarizing image data VD in a line sequence manner. A dither process circuit 7 is a binarizing process means for similarly performing the dither process of the image data VD in a line sequence manner to perform binarization. The dither process circuit 7 and the slice binarizing circuit 6 described above are operated in synchronism with the discrimination of an image area described above. RAMs 8 and 9 delay binary data Dd and Ds from the circuits 7 and 6 by a time interval corresponding to 4 lines. A switch SW1 selects one of the binary data Dd and Ds for the same image area and is operated by the image area discrimination result RE1 received through a gate circuit 10.

Thus, in this apparatus, the input image data VD is delayed for a time interval corresponding to 4 lines, and is subjected to the dither process or the slice binarization in units of blocks in accordance with the image area discrimination result RE1. The resultant binary data is selectively produced. In this manner, a binary image and a halftone image contained in a single original can be subjected to the slice binarization and the dither process, respectively, and are reproduced properly. The binary data is supplied to an output device such as a printer.

In this apparatus, therefore, an original is divided into unit blocks each consisting of 4×4 pels. When the difference $\Delta D$ between the maximum value Dmax and the minimum value Dmin of the image densities within each unit block is greater than the predetermined reference value Ct, the corresponding image is determined to be a binary image area. Otherwise, the corresponding image is determined to be a halftone image area. This method requires a relatively small circuit and is practical. However, assume a case wherein this method is used to reproduce an image of an original which has significant density changes from a gray level close to white to a gray level close to black. In this case, a block at a boundary corresponding to an abrupt density change is determined to be a binary image area. As a result, the density change of the reproduced image becomes (gray level relatively close to white)-(white)-(black)-(gray level relatively close to black). Thus, an abrupt change from (white) to (black) is involved.

FIG. 2 is a graph showing such changes in image density. Referring to FIG. 2, a solid curve α shows the density distribution over image areas A(1), A(0) and A(−1), and a dotted curve β shows the reproduced density distribution. Since density changes $\Delta D_1$ and $\Delta D_{-1}$ for the image areas A(1) and A(−1) are respectively smaller than the predetermined reference value Ct, these areas are determined to be half tone images. These image areas are therefore subjected to the dither process and are reproduced in gray levels. In the image area A(0), since the density change $\Delta D_0$ exceeds the reference value Ct, this image area is determined to be a binary image area. Therefore, within the image area A(0), pels of a portion A′(0) having a level smaller than a slice level A are reproduced with density 0, i.e., in white. However, pels of a portion A″(0) having a level exceeding the slice level A are reproduced in black, The reproduced image has the density changes of (gray level relatively close to white)-(white)-(black)-(gray level relatively close to black) as has been described above. Thus, an edge corresponding to the change from (white) to (black) is emphasized, and a noisy image is reproduced. This problem may be resolved if the reference value Ct is increased. However, in this case, characters of low levels are subjected to the dither process and are reproduced in gray levels. Therefore, the reference value Ct is generally set to be near the threshold level for binarization. This means that the two problems cannot both be resolved at the same time and that a reproduced image corresponding to details of an original image cannot be obtained.

As has been described above, another image processing apparatus has also been proposed. According to this apparatus, a selection is made between the binarization process in which the density gradient within a pel block consisting of 4×4 pels is calculated and signals are sliced in accordance with a predetermined threshold level, and the pseudo halftone process of 17 gray levels obtained with a 4×4 dither matrix. One of these processes is properly selected, so that image reproduction of an original containing both a line or character image and a halftone image can be performed. In order to reproduce a halftone image such as a photograph with about 64 gray levels, the unit gray level discrimination image area must be enlarged to a pel block of 8×8 pels. When the unit gray level discrimination image area is enlarged, there is too large a difference between the resolution in the image area reproduced by the binary process and the resolution in the image area reproduced by the half tone process. That is, the former resolution is about 16 pels, while the latter resolution is about 2 pels, resulting in an inconvenience.

In an image processing apparatus having an image discrimination function, in order to perform image processing in accordance with image density, an output from a solid-state image pick-up element such as a CCD which is proportional to the incident light intensity is utilized. In order to achieve a correspondence of the output with the image density, a signal proportional to the density is prepared by using, for example, an analog correction circuit or by converting (γ-correcting) a quantized image signal with an ROM or the like. Thereafter, binarization and other necessary processes are performed.

However, this analog correction circuit requires adjustment. The correction with an ROM causes a reduction in the amount of data obtained after correction. Both methods are thus proved to be unsuitable.

In an image processing apparatus of this type, the background of an original image or both the background and the image are detected to determine a slice level used for binarization. When each pel density obtained in the main scan is sequentially compared with a threshold level to obtain image data, if a predetermined threshold level is determined in accordance with the maximum and minimum values of the image density obtained in the main scan, it is possible to detect a uniform density of the background and to set a corresponding threshold level. However, in a diazo original, it is difficult to set a threshold level to detect a white pel and to thereby perform so-called background skipping.

It is also difficult to prevent an erroneous setting of a threshold level due to a bit defect of a solid-state image pick-up element. In view of this, it is considered to be effective to detect an average value of the pel densities within a suitable range and to set a threshold level in accordance with the determined average value.

SUMMARY OF THE INVENTION

It is an object of the present invention to eliminate the above problems.

It is another object of the present invention to provide an image processing apparatus which is capable of reproducing an image of high quality.

It is still another object of the present invention to provide an inexpensive image processing apparatus.

It is still another object of the present invention to provide an image processing apparatus which is inexpensive and which has an image discrimination function to allow excellent image reproduction.

Another object of the present invention is to provide an image processing apparatus which can form an image corresponding to an original image with high precision.

A further object of the present invention is to provide an image processing apparatus which has an image discrimination function and which has an increased number of gray levels in a reproduced image.

It is still another object of the present invention to provide an image processing apparatus which can minimize the difference between resolutions of reproduced image portions corresponding to a slice binarized image area and a half tone image area.

It is still a further object of the present invention to provide an image processing apparatus which has a simple configuration and which can produce an image of excellent quality.

Still another object of the present invention is to provide an image processing apparatus which has a simple configuration and which allows a suitable slice level.

It is still another object of the present invention to provide an image processing apparatus which has a minimum circuit size and which widens an image area for calculating an average value of pel densities, so that the average value of the pel densities in an original image is detected in real time and a binarization process of image data corresponding to each original image can be performed.

Another object of the present invention is to provide an image processing apparatus which allows setting of a slice level in real time.

The above and other objects will become apparent from the following description taken in conjunction with the accompanying drawings and the appended claims.

BRIEF DESCRIPTION OF THE DRAWINGS

FIGS. 13(A) to 13(D) are diagrams showing examples of dither matrices which are used in the image processing apparatus shown in FIG. 12;

FIG. 14 is a timing chart showing the signal waveforms at the respective parts in the apparatus shown in FIG. 12;

DETAILED DESCRIPTION OF THE PREFERRED EMBODIMENTS

The preferred embodiments of the present invention will be described in detail below.

Figure 3:
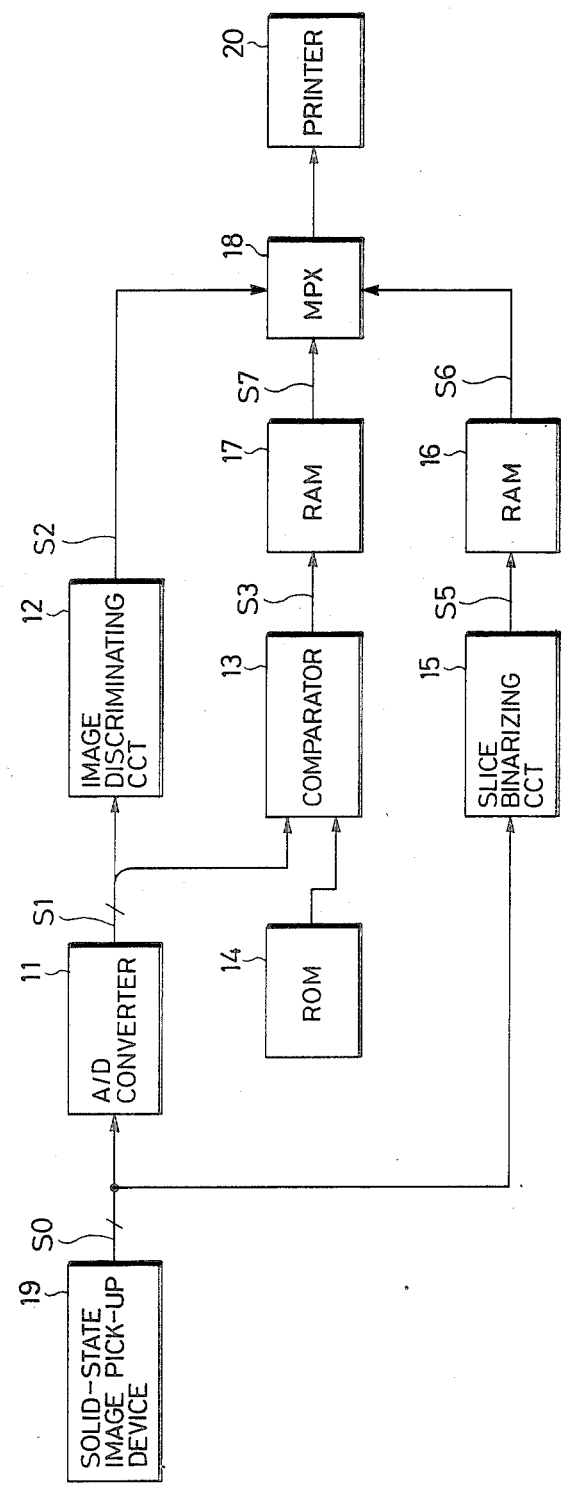
FIG. 3 is a block diagram showing the configuration of an image processing apparatus according to an embodiment of the present invention.

FIG. 3 shows an image processing apparatus according to a first embodiment of the present invention. A 6-bit A/D converter 11 (A/DC) converts into a 64-level digital image signal S1 an analog image signal S0 corresponding to a pel density and supplied from a solid-state image pick-up device 19 such as a CCD. An image discriminating circuit 12 as an area discriminating means detects an image density gradient in accordance with a digital image signal S1 continuously supplied from the A/D converter 11. Thus, the circuit 12 discriminates if the current image area (block) is a binary image area such as a character or line image or a halftone image area such as a photograph.

A comparator 13 is of 6-bit digital type. A ROM 14 stores a dither matrix of 4×4 pels. The parts 13 and 14 are used as a second binarizing means for binarizing the digital image signal S1. A slice binarizing circuit 15 is a first binarizing means for binarizing the analog image signal S0.

RAMs 16 and 17 are 1 bit×16 Kword RAMS which store binary image signals S5 and S3 produced from the slice binarizing circuit 15 and the comparator 13, respectively. The RAMs 16 and 17 are used to match the timing of a discrimination signal S2 from the image discriminating circuit 12 with the binary image signals S3 and S5. In accordance with the discrimination signal S2, a multiplexer 18 (MPX) selectively supplies to a printer 20 or the like binary image signals S6 and S7 produced from the RAMs 16 and 17.

The binary image signals S6 and S7 can be supplied to devices and circuits other than a printer, such as an MH encoder circuit.

Figure 4:
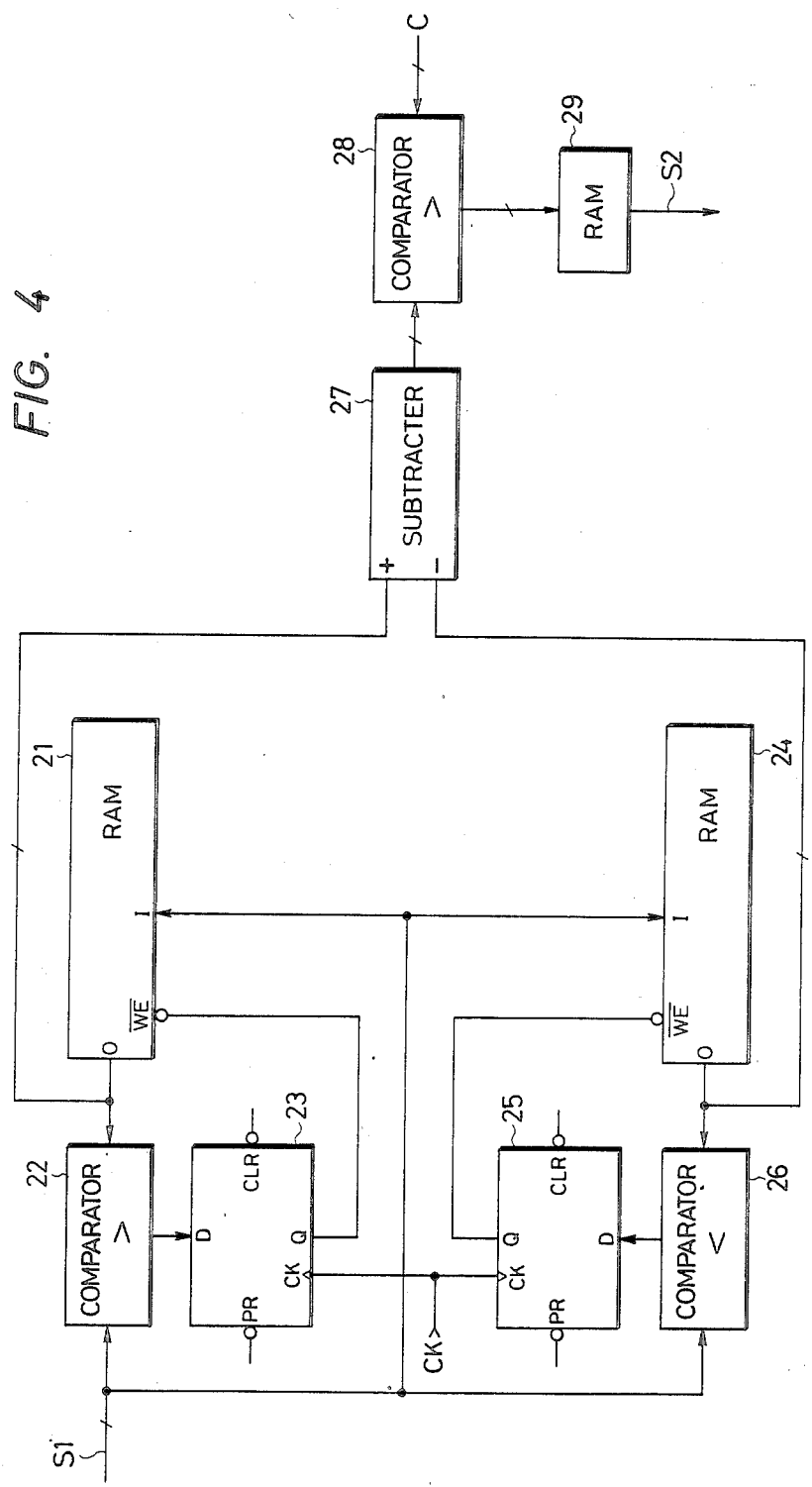
FIG. 4 is a block diagram showing an example of the configuration of an image discriminating circuit of the apparatus shown in FIG. 3.

FIG. 4 shows an example of the configuration of the image discriminating circuit 12. RAMs 21 and 24 are of 6-bit×1 Kword type. Comparators 22 and 26 are connected to output terminals O of the RAMs 21 and 24, respectively. Flip-flops 23 and 25 (F/F) are connected to write enable terminals WE of the RAMs 21 and 24, respectively. The output terminals O of the RAMs 21 and 24 are also connected to a RAM 29 through a subtracter 27 and a comparator 28. The RAM 29 is a 1-bit×1 Kword RAM storing a discrimination result.

The RAM 21, the comparator 22 and the F/F 23 divide the 6-bit image density data which is sequentially read, i.e, a signal S1 received from the A/D converter 11, into unit blocks each consisting of 4×4 pels. They also detect the maximum density Dmax of the pel density in each block.

Detection of the maximum density Dmax will be described with reference to FIGS. 5 and 6.

Figures 5, 6:
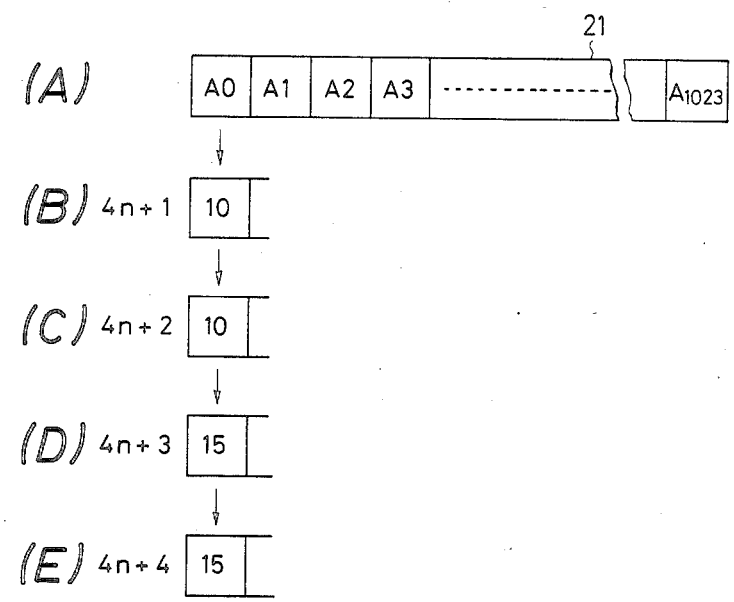
FIG. 5 is a diagram for explaining the correspondence between a digital image density and an original density.
FIG. 6 shows memory areas of a RAM in the image discriminating circuit shown in FIG. 4, the memory areas being shown in sequential states for storing the density data.

FIG. 5 shows an example wherein the pel density which is read by the solid-state image pick-up device 19 such as a CCD and which is A/D converted by the A/D converter 11 is arranged in correspondence with the original.

FIG. 6 shows the memory area of the RAM 21. As shown in (A) of FIG. 6, the RAM 21 may comprise a memory which has a memory space for storing data which is obtained by, for an original having a length of 256 mm in the main scan direction, dividing an image read at a resolution of 16 pels in the main scan direction into 4 pels, that is, data corresponding to image areas A0 to A1023.

Referring to FIG. 5, arrows H and V, respectively, correspond to the main scan direction and sub scan direction of the original. Each of the unit blocks (image area) A0, A1, and so on includes 16 pels=4×4 pels.

When the CCD is performing a main scan of the (4n+1)st line, it is assumed that the pel data S1 consisting of:

$$3 \rightarrow 7 \rightarrow 10 \rightarrow 10 \rightarrow 8 \rightarrow 9 \rightarrow ...$$

is sequentially supplied to the comparator 22 and the RAM 21 in synchronism with the scan clocks for reading pels. The comparator 22 sequentially compares the thus received pel data with the data stored in the RAM 21. If the received pel data has a higher density than that stored in the RAM 21, an output from the comparator 22 is held by the F/F 23 and the RAM 21 is set in the write mode.

When the start data of the (4n+1)st line is supplied to the comparator 22, it is unconditionally written in the RAM 21 as the initial value in the image area containing the current data. That is, referring to FIG. 5, the pel data "3" is the initial value for the image area A0, and data "8" is the initial value for the image area A1.

During scanning of the image area A0, when the next data "7" of the (4n+1)st line is supplied to the comparator 22, the initial value "3" stored in the RAM 21 is read out and the two data are compared with each other. Since 7>3, the contents of the RAM 21 are updated from "3" to "7".

When the next pel data "10" is supplied in a similar manner, the contents of the RAM 21 are updated again. When the transfer of the 4 pel data in the image area A0 of the (4n+1)st line is completed, the maximum density value "10" among the four pels is written, as shown in (B) in FIG. 6, at the address of the RAM 21 corresponding to the image area A0.

In the scanning operation of the image area A1 of the (4n+1)st line, a maximum density value "9" is similarly stored. Likewise, this processing is repeated 1,024 times for all the image areas in the (4n+1)st line. When scanning for all the image areas in this line are completed, 1,024 data are written in the respective addresses of the RAM 21 as the maximum density values in the respective image areas of the (4n+1)st line.

In the scanning operation of the (4n+2)nd line, a back-comparison of pel data with the maximum density value of the corresponding image area in the (4n+1)st line is performed. In this case, when the process for the (4n+2)nd line is completed, data "10" is written as the maximum density data in the area of the RAM 21 corresponding to the image area A0, as shown in (C) of FIG. 6.

Similarly, when scanning for the (4n+3)rd and (4n+4)th lines is completed, data "15" is written as shown in (D) and (E) of FIG. 6.

Before the initial value "20" is stored as the initial value in the process of the next ((4n+1)+1)st line, the detected data "15" as the maximum density Dmax in the image area A0 is read out from the RAM 21 and is supplied to a subtracter 27.

In the same manner as the operation of the RAM 21, the comparator 22 and the F/F 23, the RAM 24, the comparator 26 and the F/F 25 detect the minimum density Dmin of pel densities in each image area.

The subtracter 27 calculates the difference (Dmax−Dmin) between the maximum density Dmax and the minimum density Dmin of each image area, that is, a density gradient of each image area. A comparator 28 compares the supplied gradient (Dmax−Dmin) with a preset reference value C. If Dmax−Dmin>C, the corresponding image area is determined to be a binary image area containing lines or characters. However, if Dmax−Dmin<C, the corresponding image area is determined to be a halftone image area such as a photograph.

When the comparator 28 thus determines that the image area is a binary image area, it produces an output of "1". However, when the comparator 28 determines that the image area is a halftone area, it produces an output of "0".

The discrimination result of "1" or "0" from the comparator 28 is stored in a RAM 29 and is held for a time interval of the current 4-line scanning. The discrimination signal S2 as a 1-bit discrimination signal is supplied to the MPX 18 for later use as a binary image signal switching.

The binarization process for a halftone image area will be described below.

The comparator 13 compares the digital image signal S1 with a threshold matrix (dither matrix) stored in the ROM 14 and stores a comparison result in the RAM 17.

Therefore, the RAM 17 stores binary signals "1" and "0" which are obtained by the halftone process (dither process) of pel densities of an image.

The binarization process for a binary image area will be described.

In a general binarizing circuit for a binary image area, a binary determination of black or white is performed for each pel of an original. When an original having a background is to be processed, a background density of the original and a density (information density) of a character or the like are detected. A threshold level corresponding to each gray level detected is sequentially determined to be used in binarization. In processing a binary image area, it is preferable to suppress reproduction of an image background and to form a clear image with a high resolution.

In this manner, it is quite easy, as in a conventional apparatus, to use a digital image signal and to slice the digital image signal at a predetermined threshold level to thereby perform binarization of a binary image area. However, it is extremely difficult to detect the background density as well as the information density of an original and to sequentially shift the threshold level for each pel.

A digital circuit may be adopted to perform at high speed binarization for a binary image area by performing an average value calculation for densities of several pels and a threshold level calculation for such several pels. However, this method presents a problem of a large circuit scale. In view of this problem, binarization for a binary image area is performed by analog signal processing.

Figure 7:
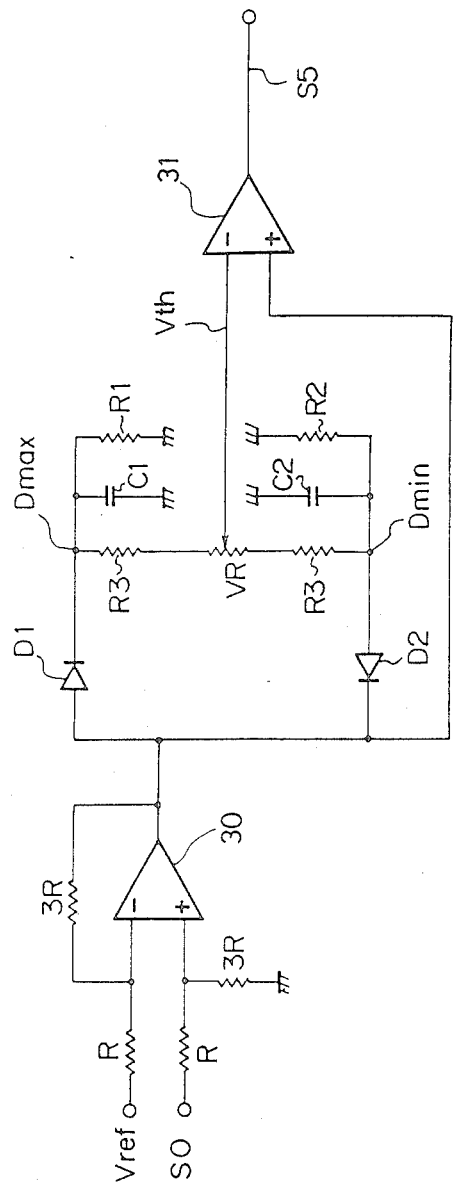
FIG. 7 is a circuit diagram showing an example of the configuration of a slice binarizing circuit of the apparatus shown in FIG. 3.

FIG. 7. shows an example of the configuration of the slice binarizing circuit 15.

Referring to FIG. 7, a differential amplifier 30 subtracts a predetermined reference value Vref from the analog image signal S0 and produces a positive or negative output signal. A maximum density signal D'max is produced when the output from the differential amplifier 30 is positive. The signal D'max is passed through a diode D1 and is averaged by a capacitor C1 and a resistor R1. The average value is stored in the capacitor C1. A minimum density signal D'min is produced when the output from the differential amplifier 30 is negative. The signal D'min is passed through a diode D2 and is averaged through a capacitor C2 and a resistor R2. The average value is stored in the capacitor C2.

A threshold value Vth is obtained by dividing by a resistor a voltage across the two ends of the capacitor C1 or C2. The threshold value Vth can be rendered variable through a variable resistor VR to allow density control. When the resistance of resistor R3 and the variable resistance VR are set to be larger than those of the resistors R1 and R2, discharging from the capacitors C1 and C2 can be negligible.

The threshold value Vth is supplied to a comparator 31 which also receives an output from the differential amplifier 30. Thus, the analog image signal S0 is converted into a binary image signal S5 which is supplied to the RAM 16.

Figure 8:
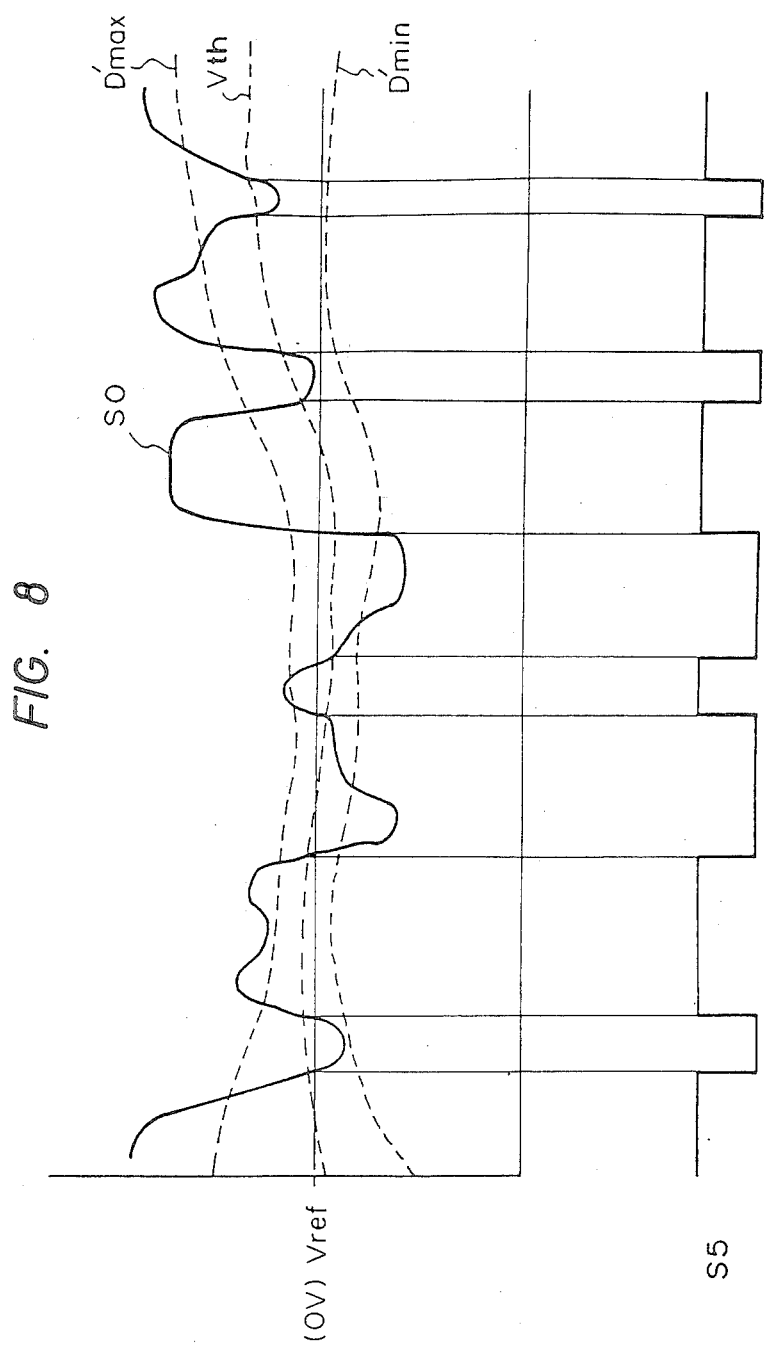
FIG. 8 shows the signal waveforms at the respective portions of the circuit shown in FIG. 7.

FIG. 8 shows the relationship between the signal S0, D'max, D'min, Vth and S5. Even if the average level of the image signal S0 changes, dark and bright levels are independently detected in the form of an average value. Therefore, the threshold level can be set to be an intermediate value at all times, so that image data can be binarized with a high efficiency.

Discimination of an image area can be performed for each 4 lines, that is, for each block of 4×4 pels, along the main scan direction. In order to select one of the binary image signals S3 and S5 in synchronism with the discrimination signal S2, the signals S3 and S5 must be delayed for a time interval corresponding to 4 lines. In consideration of this, the sliced binary image signal S5 and the dither processed binary image signal S3 are delayed by the RAMs 16 and 17, respectively.

The sliced binary image signal S6 and the dither processed binary image signal S7 are supplied to the MPX 18. The MPX 18 selects one of the input signals and supplies the selected signal to a printer or the like.

A means for slice binarizing the analog image signal is not limited to one in the embodiment described above and can be performed by comparing the analog image signal with an image signal which is previously received and has been delayed through a delay circuit or the like. The circuit in this case can also consist of a small number of circuit elements, as in the case shown in FIG. 7. Furthermore, the image discriminating circuit and the discriminating algorithm are not limited to those described above and various other circuit configurations and algorithms may be adopted. Therefore, the present invention must not be construed to be limited to the above embodiment.

A second embodiment of the present invention will now be described with reference to FIGS. 9 and 10.

Figure 1:
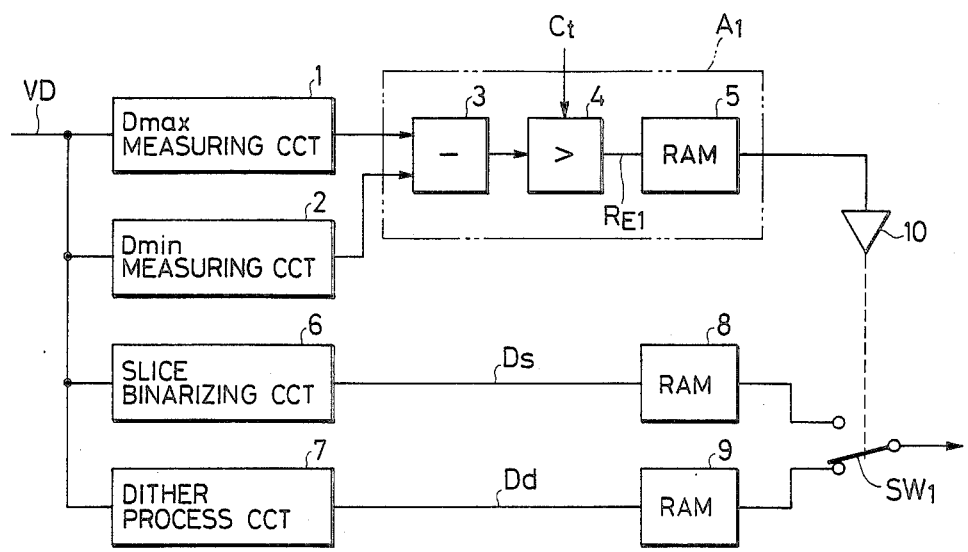
FIG. 1 is a block diagram showing a conventional image processing apparatus.
Figure 2:
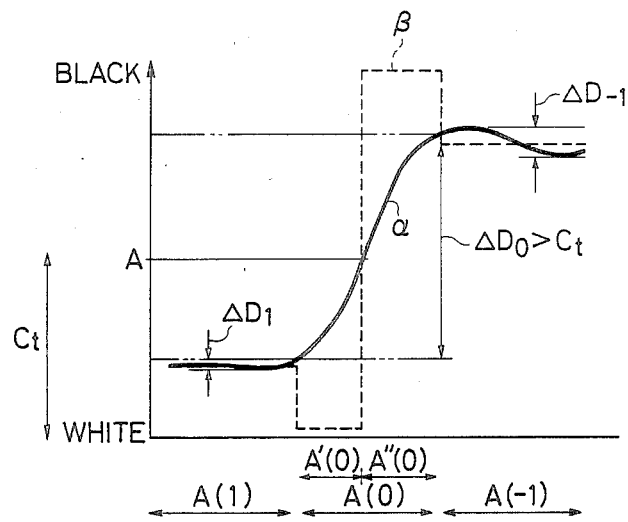
FIG. 2 is a graph showing the density distribution and the reproduced density distribution in image areas A(1), A(0) and A(−1), respectively.
Figure 9:
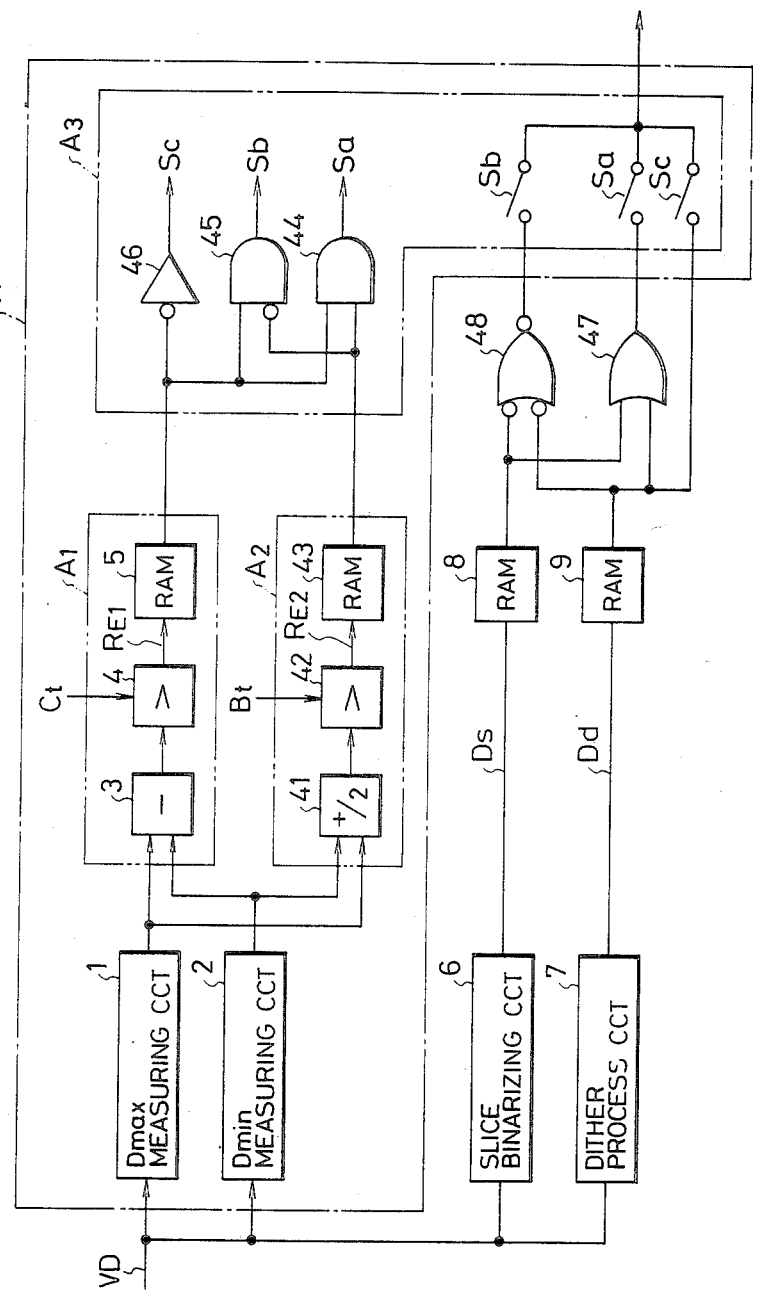
FIG. 9 is a block diagram showing an image forming apparatus according to a second embodiment of the present invention.
Figure 10:
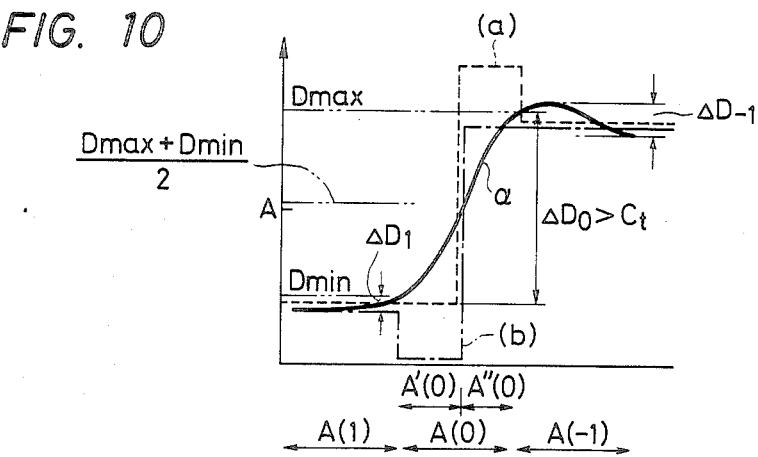
FIG. 10 is a graph showing the reproduced density distribution when the same image as in the case of FIG. 2 is processed using the apparatus shown in FIG. 9.

The same reference numerals as in FIGS. 1 and 2 denote the same parts in FIGS. 9 and 10 and a detailed description thereof will be omitted.

Referring to FIG. 9, a Dmax measuring circuit 1, a Dmin measuring circuit 2, and a discriminating means A1 correspond to the image discriminating circuit 12 shown in FIG. 4.

FIG. 9 is a block diagram of an image processing apparatus of the second embodiment of the present invention. An adder 41 performs an averaging calculation in accordance with (maximum density Dmax −− minimum density Dmin)/2 for each block in accordance with the maximum density Dmax and the minimum density Dmin received from the Dmax and Dmin measuring circuits 1 and 2. A comparator 42 compares the average value received from the adder 41 with a predetermined reference value Bt. The comparator 42 produces an image area discrimination result RE2 which is "1" when the image area is dark and is "0" when the image is whitish. As in the case of a discrimination performed by the comparator 4, the image area discrimination by the comparator 42 is performed for each 4 lines. A RAM 43 stores the current discrimination result Re2 until the next 4 lines are scanned. The members 41, 42 and 43 constitute a second discriminating means A2. Gate circuits 44, 45 and 46 are connected to the output sides of the RAMs 5 and 43. The gate circuit 44 produces an output of "1" when the average value is larger than the reference value Bt and the outputs from the RAMs 5 and 43 are both "1". The gate circuit 45 produces an output of "1" when the average value is smaller than the reference value Bt and the outputs from the RAMs 5 and 43 are "1" and "0", respectively. When the image area is determined to be a half tone image area, i.e., when the output from the RAM 5 is "0", the gate circuit 46 produces an output of "0". In this case, the gate circuit 46 produces an output of "1" irrespective of the average value. An OR gate circuit 47 and an AND gate circuit 48 are connected to RAMs 8 and 9, respectively, which latch the binary data Ds obtained from a slice binarizing circuit 6 and the binary data Dd obtained from a dither binarizing circuit 7, respectively. A switch Sa is connected to the output end of the OR gate circuit 47. A switch Sb is connected to the output end of the AND gate circuit 48. A switch Sc is directly connected to the output end of the RAM 9. These switches Sa to Sc are operated in response to outputs of "1" from the gate circuits 44 to 46, respectively. The switches Sa to Sc and the gate circuits 44 to 46 together constitute a selecting means A3. The selecting means A3, the first and second discriminating means A1 and A2, and the Dmax and Dmin measuring circuits 1 and 2 constitute a discriminating-/selecting means A. The circuit shown in FIG. 9 discriminates for each image area if this image area is a dark image area or a whitish image area. One of the switches Sa to Sc is turned on in accordance with a discrimination result.

When the switch Sa is turned on, that is, when the image area is a dark image area, the binary data Ds from the slice binarizing circuit 6 and the binary data Dd from the dither binarizing circuit 7 are ORed (as in process a to be described later). Therefore, the image data produced at this time has a clear black edge (e.g., edge of a black character) as compared with image data which is obtained by the dither process.

When the switch Sb is turned on, that is, the image area is a whitish image area, the binary data Dx from the slice binarizing circuit 6 and the binary data Dd from the dither binarizing circuit 7 are ANDed (as in process b to be described later). Therefore, the output image data produced in this case has a clear white edge (e.g., white character with a black background) as compared to image data which is obtained by the dither process.

When the switch Sc is turned on, since this image area is a halftone image area, the binary data Dd from the dither binarizing circuit 7 is directly produced. The binary data is supplied to an output device such as a printer or to an MH encoder or the like.

In this embodiment, the switches Sa to Sc are operated by the gate circuits 44 to 46. However, the OR gate circuit 47 may be turned on only when there is an output from the gate circuit 44.

The images as described above with reference to the former embodiment are processed in the image processing apparatus of this embodiment having the above-described configuration. A binary image area A(0) of interest is subjected to the process (to be referred to as the process a hereinafter) as indicated by the dotted line (a) in FIG. 10 or the process (to be referred to as the process b hereinafter) as indicated by the alternate long and short dashed line (b) in FIG. 10 in accordance with the average density of this area.

In the process a, portions of the image area A(0), a portion A'(0) (portion which will be reproduced in white upon binarization) having a density lower than the slice level A is subjected to the dither process following the image area A(1). A portion A''(0) of the image area A(0) which has a density higher than the slice level A is reproduced in black in accordance with the slice binarization. As a result, the reproduced image in the image area A(0) will not involve any abrupt change in density from (white) to (black) as in the conventional case, and an image with an emphasized black edge next to the image area A(−1) is obtained.

In the process b, the portion A''(0) (portion which will be reproduced in black upon binarization) having a density higher than the slice level A is subjected to the dither process following the image area A(−1). The portion A'(0) of the image area A(0) having a density smaller than the slice level A is reproduced in white in accordance with the slice binarization. As the result, the reproduced image of the image area A(0) will not have an abrupt change in density from (white) to (black). Therefore, an image with an emphasized edge to the image area A(1) is obtained.

Which one of the processes a and b is selected is determined in accordance with which one of the switches Sa and Sb is operated. In other words, the selection of the processes a and b is determined in accordance with which one of the gate circuits 44 and 45 produced an output of "1". Therefore, the condition for adopting the process a or b is summarized as follows:

TABLE 1

| Condition | Process |
|---|---|
| (Dmax + Dmin)/2 ≧ B | a |
| (Dmax + Dmin)/2 < B | b |

The condition summarized in Table 1 is an example for a simplest application of the present invention. In accordance with this example, the process a is selected so as not to reproduce a white region at an edge when the average density (Dmax+Dmin)/2 of a binary image area exceeds a predetermined reference value Bt, that is, when the image is dark. However, when the average value (Dmax+Dmin)/2 of the binary image area is smaller than the reference value Bt, the process b is selected so as not to reproduce a black area at the edge portion. As shown in FIG. 10, the positive or negative gradient of the density need not be specifically considered if the process a or b is adopted. The predetermined reference value Bt can be the slice level A. An intermediate density can be an average value of 16 pels within each block or an internal ratio of the densities Dmax and Dmin in accordance with a predetermined ratio. In general, backgounds have small density and characters are black. Therefore, in the case of a character image portion, the background is reproduced in a halftone image while the binary image area is subjected to the process a so as to improve the resolution of the characters. Then, clear character images can be obtained.

In accordance with a third embodiment of the present invention, a process mode for performing a complete binarization can be adopted.

In accordance with Table 1, one of the processes a and b is selected for a slice binary image area. However, depending upon a particular original, a conventional slice binarization produces a better result. For example, in the case of an original such as a dot image original having many thin lines within a single image, the discrimination results of image areas will continuously indicate binary image areas. In such a case, image areas adjacent to an image area of interest are discriminated, and the image area of interest is discriminated in accordance with the obtained discrimination result. More specifically, when an image area of interest is discriminated to be a binary image area and the immediately preceding and succeeding areas (along the main scan direction) thereof are similarly discriminated to be binary image areas, neither of the processes a and b is selected but the conventional slice binarization is adopted. In this case, the resolution is improved.

Figure 11:
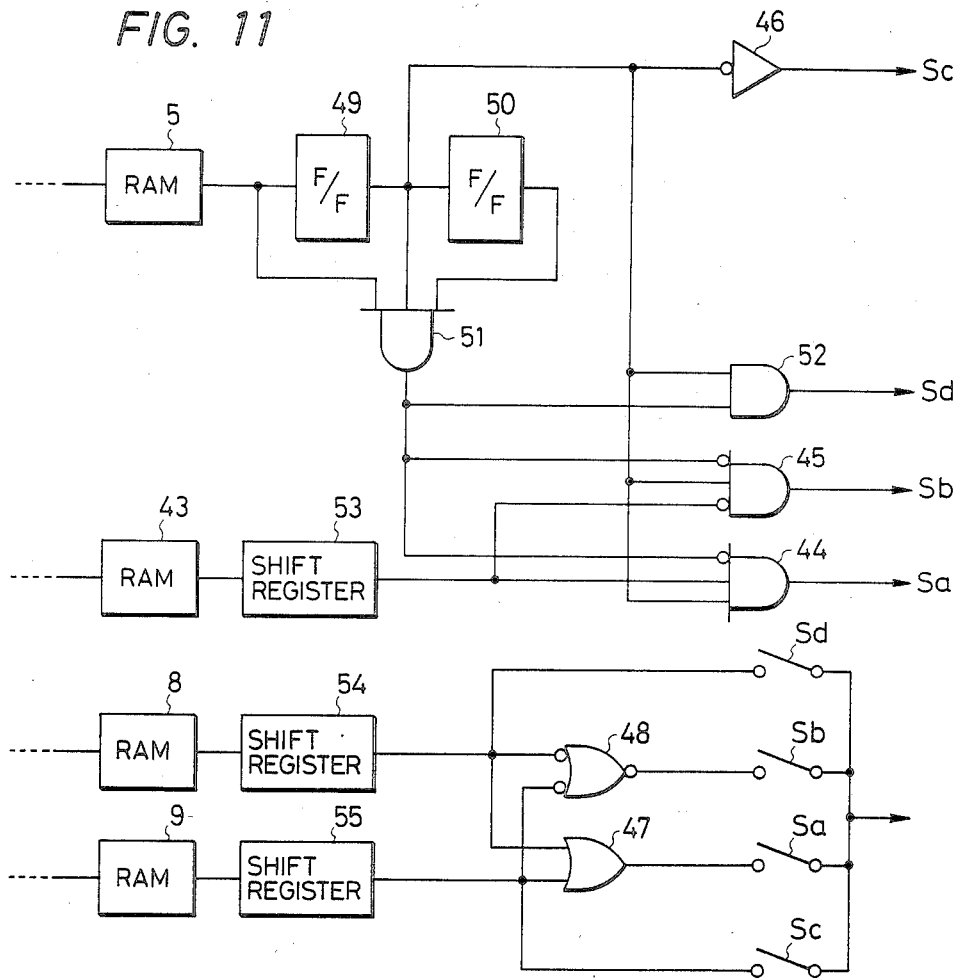
FIG. 11 is a block diagram showing an image processing apparatus according to a third embodiment of the present invention.

FIG. 11 is a block diagram showing the main part of an image processing apparatus according to the present invention. The same reference numerals as in the former embodiments denote the same parts, and a detailed description thereof will be omitted. The circuit configuration prior to the RAMs 5, 43, 8 and 9 is similar to that shown in FIG. 9 and is therefore omitted.

Although each of the gate circuits 44 and 45 in this embodiment has three input terminals unlike the earlier embodiments, they are designated with the same reference numerals since they operate basically in the same manner.

Referring to FIG. 11, the image area discrimination result produced from the RAM 5 is delayed by F/Fs 49 and 50. An AND gate 51 selects a case wherein all of the three image areas A(1), A(0) and A(−1) are binary image areas. In this case, a switch Sd is operated by a gate circuit 52 to select the slice binarization process. Shift registers 53, 54 and 55 compensate for the delay by the F/F 49 to match the timing.

TABLE 2

| Condition | Process |
|---|---|
| Dmax > E | a |
| Dmin < F | b |
| Dmax > E & Dmin < F | Slice binarization |

For E − F < Ct

Table 2 above shows an example wherein the process mode for performing complete binarization is set in addition to the processes a and b. In Table 2, E and F (E>F) are predetermined values. Note that E−F<Ct. When the maximum density Dmax of an image area exceeds the value E, that is, when the image is relatively dark, the process a is performed so as to emphasize black (e.g., a black edge of a black character is emphasized). When the minimum density Dmin is smaller than the value F, that is, when the image area is relatively bright, the process b is performed (e.g., a white edge of a white character or the like is emphasized).

When the maximum density Dmax exceeds the value E and the minimum density Dmin is smaller than the value F, the image area is determined to have a high contrast between black and white and the conventional slice binarization (complete binarization) is performed. In this manner, when the processes are selectively set as in Table 2 above, an excellent reproduced image can be obtained.

Although the above description is made with reference to a monochrome image, the present invention can also be applied to a color image.

As has been described above, different processes such as the dither process and the slice binarization process, for example, are performed within a single image, so that a reproduced image will not have an abrupt density change from (white) to (black) and will be reproduced with high precision.

Figure 12:
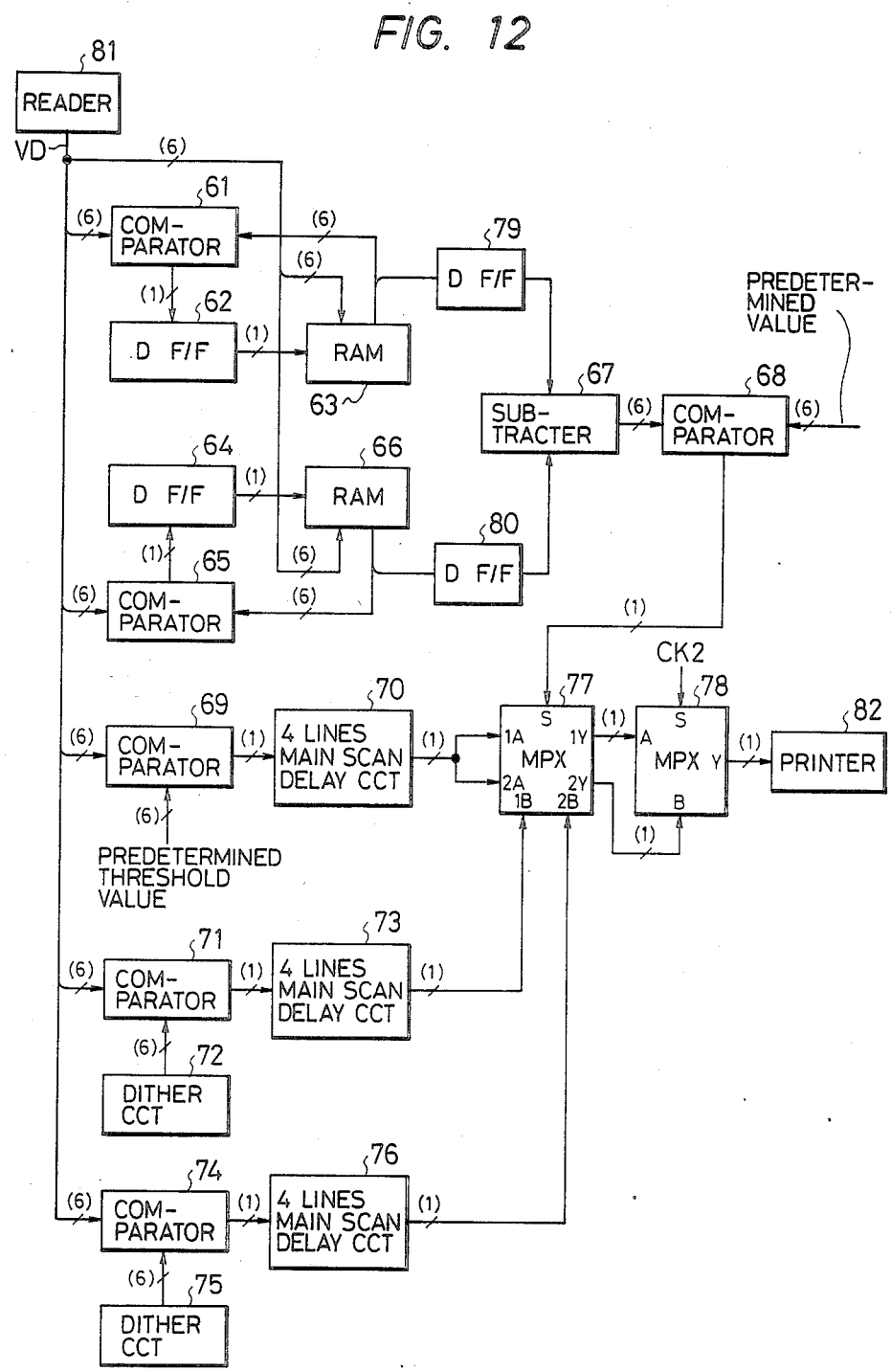
FIG. 12 is a block diagram showing an image processing apparatus according to a fourth embodiment of the present invention.

A fourth embodiment of the present invention will now be described. FIG. 12 is a block diagram showing an image processing apparatus according to the fourth embodiment of the present invention.

In FIG. 12, showing the configuration of the apparatus of the fourth embodiment, a comparator 61 compares a digital image signal VD from a reader 81 with a stored signal. More specifically, the comparator 61 compares a 6-bit input image signal VD with a 6-bit image signal read out from a static RAM 63 to be described later and having a capacity of 6-bit×1 Kword. When the input image signal VD has a higher density than the stored image signal, the comparator 61 supplies a density level comparison output to a D F/F 62 which controls the write operation in the RAM 63, so that the input image signal is stored in the RAM 63 at a predetermined time. Thus, the comparator 61, the RAM 63, and the D F/F 62 constitute a maximum density level detection circuit which sequentially compares the pel density of an original image in the main scan direction with a predetermined level and detects the maximum density level. The maximum density level is detected for each pel block which is obtained by dividing an original image into unit blocks of 4×4 pels. Taking an example of a B4 size original which is a maximum size of originals which may be usually copied, one main scan operation results in 4096 pels since one block consists of 16 pels. Therefore, the RAM 63 must have a capacity of 4096/4 pels, i.e., 1 Kword.

The procedures for detecting the maximum density level within each 4×4 pel block will be described below. The maximum density level stored in the RAM 63 is a maximum density level in a pel block which is scanned by a combination of a main scan and a sub scan. Therefore, the initial main scan of an original image is defined as the first main scan. Starting from the start pel or first pel in the (4n+1)st (where n=0, 1, 2, . . .) main scan, the density level at the (4n+1)st (where n=0, 1, 2, . . .) main scan is written in the RAM 63 as the initial value of the density levels of the respective pel blocks. Therefore, the following operation is performed within a pel block including the start pel of the first main scan. The density level of the first pel in the first main scan is stored in the RAM 63. Next, a pel signal of the second pel is supplied to the comparator 61 and is thereby compared with the pel signal of the first pel stored in the RAM 63. If the density level of the second pel is higher than that of the first pel, the comparator 61 supplies a corresponding output to the D F/F 62 which then updates the density level of this pel in the RAM 63 to the density level of the second pel.

When the image signal of the third pel is supplied to the comparator 61, it repeats the above operation to perform a comparison of the input image signal with the density level stored in the RAM 63. If the density level of the third pel is higher than the stored density, the density level of this pel block stored in the RAM 63 is rewritten as the density level of the third pel. However, if the density level of the stored pel signal is higher than the input image signal, the density level for the pel block stored in the RAM 63 is kept unchanged. Then, a comparison between the pel signal of the fourth pel with the stored pel signal is performed.

As a result of four comparison operations as described above, when the pel signal of the fifth pel is supplied to the comparator 61, the maximum density level among those of the first to fourth pel signals is stored as the maximum density level for the 4×4 pel block in the RAM 63.

Then, the density level of the fifth pel signal is stored in the RAM 63, as the density level initial value for the next pel block, by incrementing the memory address of the RAM 63. Thereafter, the procedures for the start pel block of the first main scan are repeated for the second pel block so as to detect the maximum density level among those of the fifth to eighth pels and the detected maximum density is stored in the second memory address.

When detection and storage of the maximum density levels as described above are performed for all the pel blocks within one main scan, the maximum density levels for all the pel blocks within the first main scan are stored in the 1Kword RAM 63.

When the second main scan is started and the pel signal of the first pel of the second main scan is supplied to the comparator 61, the memory address of the RAM 63 is returned to the start address. The maximum density level for the first pel block obtained in the first main scan is read and is compared with the density level of the input pel signal. In the same manner, the input pel signals and the stored pel signal are sequentially compared for the first to fourth pels in the second main scan, thereby updating the maximum density level for the first pel block. When the fifth pel signal in the second main scan is supplied to the comparator 61, the memory address of the RAM 63 is incremented. The input pel signals are sequentially compared with the maximum density level stored for the second pel block obtained in the first main scan.

Maximum density level detection and storage as described above are sequentially repeated for the third and fourth main scans. When the fourth main scan is completed, the maximum density level within 16 pels of the start 4×4 pel block is detected and stored in the start memory address of the RAM 63.

A comparator 65, a RAM 66 and a D F/F 64 for controlling the write operation in the RAM 66 constitute a minimum density detection circuit for detecting and storing the minimum density level for each pel block in a manner similar to that of the maximum density level detection circuit described above. As has been described above, when the fourth main scan is completed, the minimum density levels for the respectiive 4×4 pel blocks are detected and stored in the RAM 66.

In the fifth main scan, in the same manner as each 4×4 pel block for the first line, the density level of the (4n+1)st (where n=0, 1, 2, . . .) pel is stored as the density level of the respective pel blocks in the RAMs 63 and 66 for each 4×4 pel block of the second line. Before the density level of each pel block of the second line is detected and stored, the maximum and minimum values of the density levels of the respective pel blocks of the first line obtained in the first to fourth main scans are read out from the RAMs 63 and 66, latched in D F/Fs 79 and 80 for a time interval corresponding to the subsequent 4 pel signals, and supplied to a subtracter 67.

The subtracter 67 calculates the difference between the maximum density Dmax and the minimum density level Dmin for each image area consisting of 4×4 pel blocks so as to discriminate the density gradient of each image area. If the difference is small, the image area has a smooth density change and can therefore be determined to be a halftone image area such as a photograph. However, if the calculated difference is large, the image area can be determined to be a binary image area such as a line or character. A different output signal from the subtracter 67 is supplied to a comparator 68 which compares the input signal with a predetermined value corresponding to an intermediate value within a density level range. In accordance with whether the image area is a binary image a halftone image or a multi-value image area, the comparator 68 produces a 1-bit signal of "0" or "1".

Referring to FIG. 12, the comparators 61, 65 and 68, the RAMs 63 and 66, the D F/Fs 62, 64, 79, and 80, and the subtracter 67 correspond to the image discriminating circuit 12 shown in FIG. 12.

The circuit configuration for binarizing or quantizing each image area in accordance with the image area density gradient discrimination result will now be described. In the configuration shown in FIG. 12, a comparator 69 is a circuit for sequentially comparing an input image signal with a predetermined threshold level, thereby binarizing the input signal. The binary output image data from the comparator 69 is supplied to a 4 line main scan delay circuit 70. A comparator 71 is a first dither binarizing circuit which compares an output from a dither circuit 72 with an input image signal. The comparator 71 supplies the dither binarized output image data to a 4 line main scan delay circuit 73. A comparator 74, a dither circuit 75, and a 4 line main scan delay circuit 76 similarly constitute a second dither binarizing circuit. The difference between the dither circuits 72 and 75 resides in that although the corresponding threshold levels in a 4×4 dither matrix hold a predetermined relationship, the pels constitute different dither matrices, as shown in FIGS. 13(A) and 13(B) or FIGS. 13(C) and 13(D). In the dither matrices shown in FIGS. 13(A) and 13(B), the corresponding threshold levels are different by "2". In the dither matrices shown in FIGS. 13(C) and 13(D), the threshold levels are different by one cycle, that is, the corresponding threshold levels are different by "32". In a conventional 4×4 dither matrix, only 17 pseudo gray levels can be produced. However, when the two types of dither matrices as described above are used, the two dither binary output image data can be combined to provide 33 pseudo gray levels.

Discrimination of each image area as described above is performed for an image area consisting of 4×4 pel blocks. Therefore, whether to perform the binarization or dither binarization or multi-level quantization binarization for each pel block of the first line in the first to fourth main scans is performed during the fifth to eighth main scans. Therefore, the 4 line main scan delay circuits 70, 73 and 76 are used to match the timings in view of this.

The binary output image data and the two types of dither binarized or quantized output image data which are delayed for a period corresponding to 4 lines are supplied to input terminals 1A and 2A and 1B and 2B of an MPX 77. The MPX 77 produces from output terminals 1Y and 2Y a suitable output in accordance with the "1" or "0" level of the image area density gradient discrimination input received at a control input terminal S from the comparator 68. When the image area is determined to be a binary image area, the binary output image data is produced. When the image area is determined to be a halftone image area, quantized output image data (image data from the first and second dither circuits) is produced.

The two image data produced from the MPX 77 are supplied to an MPX 78 and converted into three values. A select input terminal S of the MPX 78 receives a clock signal CK2 having a speed twice that of an externally supplied image data transfer clock. The MPX 78 alternately switches the two image data and converts them into the three values in the following manner.

FIG. 14 is a timing chart for explaining image reproduction of a dither three-value image area formed by the two types of dither patterns as described above and of a binary image area formed by slicing at a predetermined threshold level. As shown in FIG. 14, an image area density gradient discrimination output 17-S supplied to a select input terminal S of the MPX 77 is "1" in the first half of the period, indicating a slice binary image area, and is "0" in the second half, indicating a halftone image area. When the binary image data is supplied to the input terminals 1A, 2A, 1B and 2B of the MPX 77, the two series of image data having waveforms shown in FIG. 14 are obtained from the output terminals 1Y and 2Y and are supplied to input terminals A and B of the MPX 78. An output Y of the MPX 78 produces image data having the waveform as shown in FIG. 14.

Therefore, when the discrimination result of the image area gradient is binary image data sliced by the comparator 69, the image data is supplied to a printer 82 such as a laser beam printer. When the laser beam printer is used, the laser beam is repeatedly turned on and off at a time interval corresponding to one pel and an electrostatic image corresponding to black and white is obtained in units of pels. However, if the discrimination result of the image area gradient is halftone image data, the ON/OFF periods of the laser beam are determined in the following manner. For pels ⑥ and ⑧ in a halftone image area period indicated at the lowermost row in FIG. 14, the ON period of one pel is determined by the dither binary outputs 1Y and 2Y. For example, for the pel ⑥, for the first half of the period, the laser beam is turned on in accordance with the threshold level of the dither circuit 72, and for the second half, the laser beam is turned off in accordance with the threshold level of the dither circuit 75. As a result, for the pel ⑥, two electrostatic latent images having a spot diameter about half of the normal diameter are formed in an area of one pel. Therefore, by combining the two types of dither matrices in which respective threshold levels have a predetermined relationship, i.e., one pel obtained by the dither binarization can be reproduced in one of white, black and a third level intermediate therebetween.

Multi-level quantization of the reproduced image density in accordance with the combined dither matrices can be changed to four- or five-level quantization by using four or five different dither matrices. For example, a five-level quantized image can be obtained with the four dither matrices as shown in FIGS. 15(A) to 15(D). Four dither circuits are used which have four different types of dither matrices with threadhold levels having a predetermined relationship such that each threshold is larger than the previous one by 1. The dither binary output image data from these dither circuits are switched in a time-serial manner to change the spot diameter of the laser beam of one pel at the ratios of ¼, 2/4, ¾ and 4/4, respectively. Then, the density level of each pel can be divided and a reproduced image can have 65 gray levels.

The slice level in the slice binarization can be automatically shifted in accordance with the calculation of the maximum and minimum densities in each image area.

Figures 15A, 15B, 15C, 15D, 16:
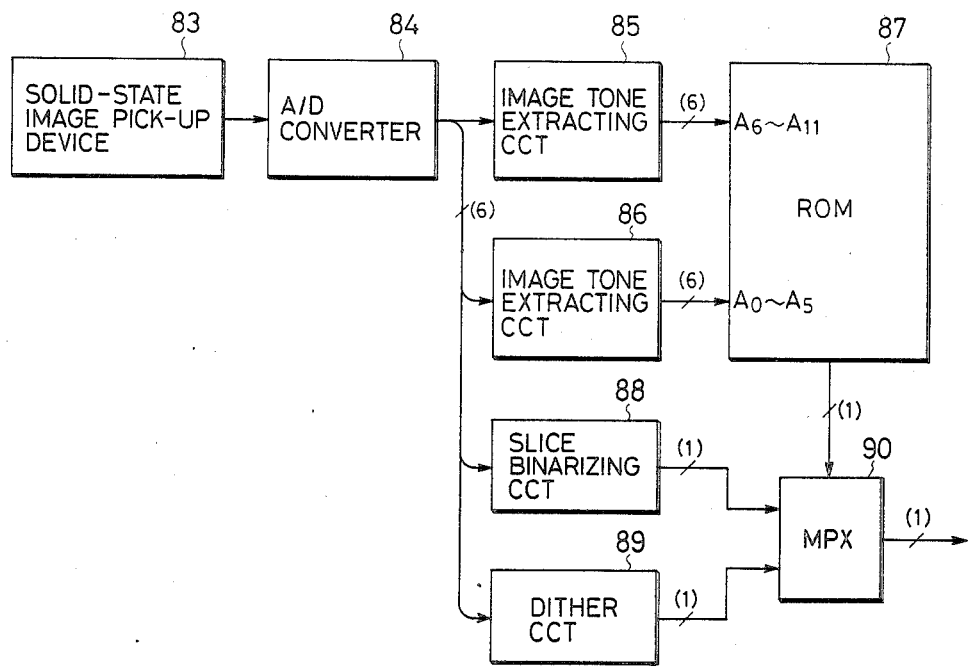
FIGS. 15(A) to 15(D) are diagrams showing examples of four types of dither matrices which can be used to obtain a five-level reproduced image.
FIG. 16 is a block diagram showing an image processing apparatus according to a fifth embodiment of the present invention.

A fifth embodiment of the present invention will now be described. FIG. 16 is a block diagram of an image processing apparatus according to the present invention. Numerals on respective signal lines denote the bit number of the signals transmitted therethrough.

An analog image signal from a solid-state image pickup device 83 such as a CCD is quantized into a 63-level (6-bit) digital image signal by an A/D converter 84. Image tone extraction circuits 85 and 86 extract the image tone in each image block consisting of a plurality of pels. In this embodiment, each unit block consists of 4×4 pels, and a maximum density Dmax and a minimum density Dmin of each block are extracted.

The image tone extraction circuits 85 and 86 correspond to the comparators 22 and 26, the F/Fs 23 and 25, and the RAMs 21 and 24. Thus, each of the circuits 85 and 86 consists of a RAM and a comparator. Every time the original scan of unit block by the CCD is completed, the densities Dmax and Dmin are obtained as 6-bit signals.

A slice binarizing circuit 88 slices the 6-bit pel signal at a predetermined slice level. A dither process circuit 89 uses a dither matrix for performing binarization. The slice binarizing circuit 88 and the dither circuit 89 have RAMs 16 and 17 as shown in FIG. 3. The slice binarizing circuit is an automatic slice binarizing circuit which calculates the maximum and minimum densities within a predetermined range of an original and selects a slice level at an intermediate level between the detected maximum and minimum levels. The dither circuit 89 is a three-level dither circuit. The image signals from the circuits 88 and 89 are stored in buffer memories for matching of timing with the outputs from the circuits 85 and 86, and are supplied to an MPX 90. The MPX 90 is connected to an output device such as a printer.

The slice binarizing circuit can be a general slice binarizing circuit using a fixed threshold level. The dither circuit can be a general binarizing dither circuit using one dither matrix.

A ROM 87 receives the image data at its address inputs and stores numbers which are calculated in accordance with the image tone data and which correspond to the dither or slice process. Therefore, the binarizing method can be selected in accordance with the image data supplied for each image area.

Figure 17:
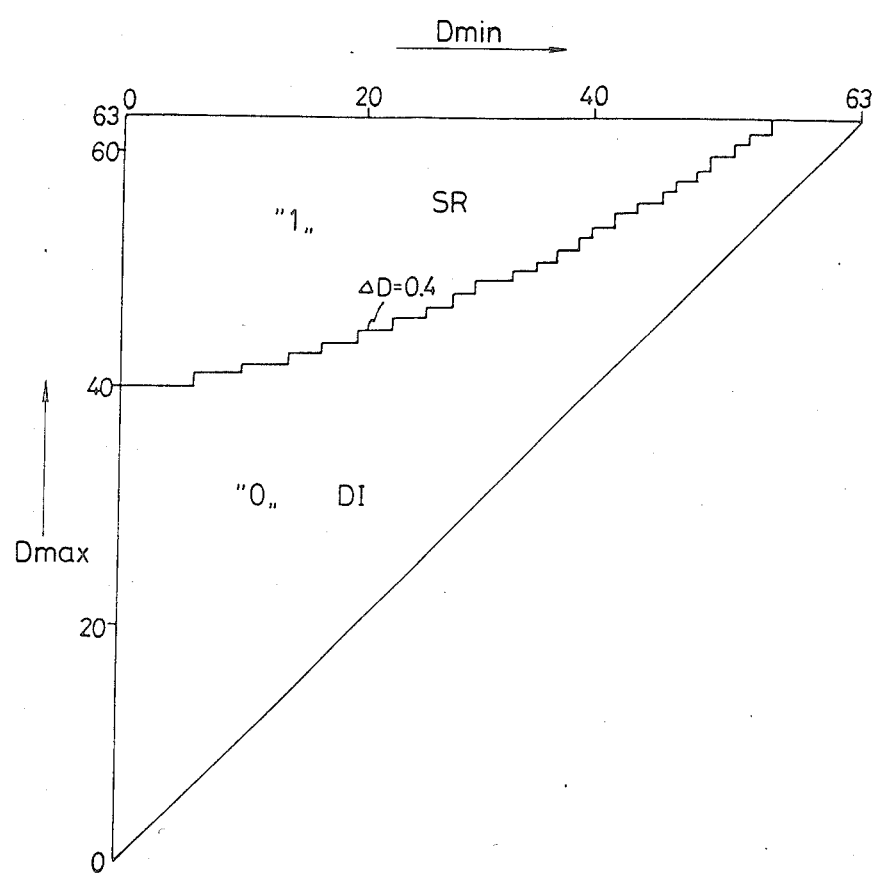
FIG. 17 is a data map written in the ROM of the apparatus shown in FIG. 16.

FIG. 17 shows a map of data written in the ROM 87. "1" is written in the ROM 87 for selecting a slice binarization process Sr when the difference ΔD=(Dmax−Dmin) of a 4×4 image area is 0.4 or more. "0" is written for selecting a dither process DI when the difference ΔD is less than 0.4. In FIG. 17, a boundary line indicates a line corresponding to ΔD=0.4.

The ROM 87 has a capacity of 4 Kword×1-bit. A signal Dmin is connected to address lines A0 to A5, and a signal Dmax is connected to address lines A6 to A11. The MPX 90 has a memory such as a RAM for storing data "1" or "0" from the ROM 87.

The effect and advantage obtained with this method are that image processing corresponding to a density can be performed without requiring the use of a logarithmic correcting means which is conventionally used since the output signal from the CCD does not correspond to the original density. In the γ-correction method of the ROM used in the conventional cases, when a 6-bit output signal from the CCD is converted into a signal proportional to the original density, the obtained signal ordinarily has 5 bits or less. Therefore, when the image density is discriminated at a difference ΔD of 0.4, a maximum of only (32×32)/2 levels can be obtained. In contrast to this, in accordance with the method of the present invention, since the CCD levels are calculated and written in the ROM, a maximum of (64×64)/2 levels is obtained, resulting in a precision four times that obtained with the conventional method. Furthermore, since the ROM areas have one-to-one correspondence with the signals Dmax and Dmin, fine correction of the threshold levels is facilitated.

Figure 18:
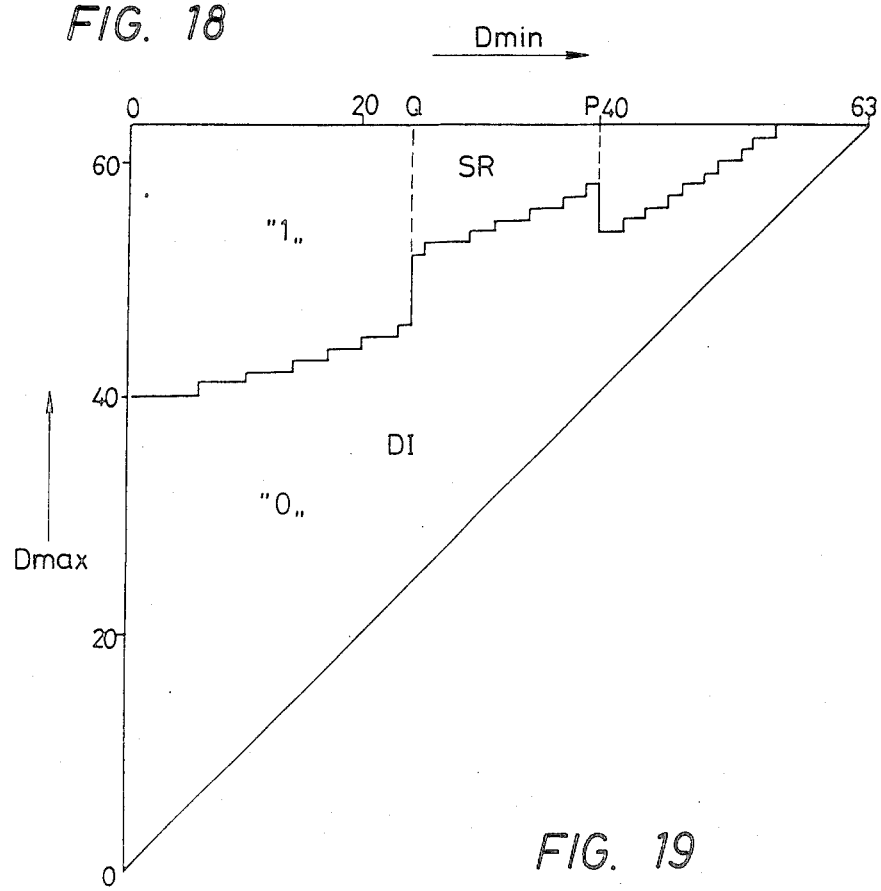
FIG. 18 is another example of a data map written in the ROM of the apparatus shown in FIG. 16.

A case is considered wherein when Dmin≧P, the slice binarization process is selected for ΔD=0.4, when P>Dmin>Q, the slice binarization process is selected for ΔD=0.6, and when Dmin≦Q, the slice binarization is selected for ΔD≧0.4. FIG. 18 shows the ROM data in this case.

Figure 19:
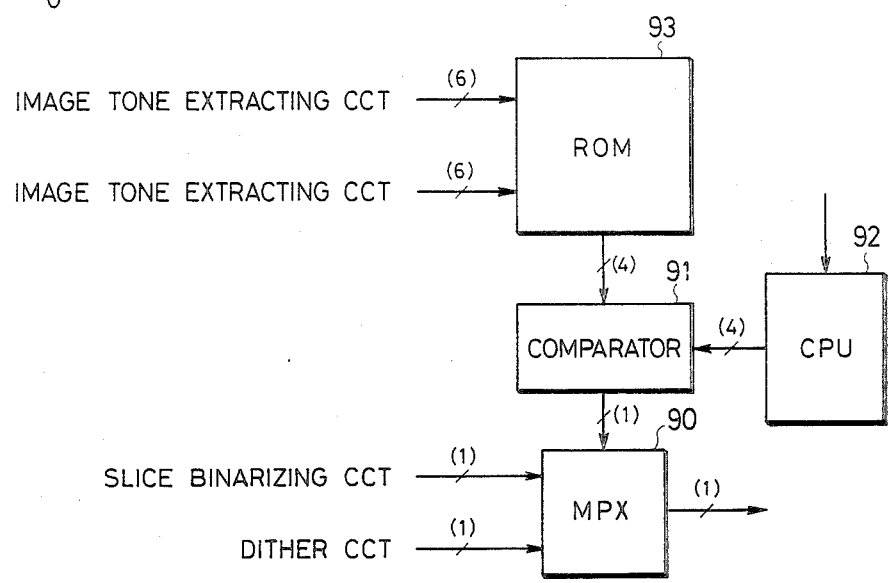
FIG. 19 is a block diagram showing an image processing apparatus which has a variable threshold level according to a sixth embodiment of the present invention.

A sixth embodiment of the present invention will be described below. FIG. 19 shows a block diagram when a 4 Kword ×4-bit ROM is used so that the user can change the threshold level for automatic image process selection in accordance with each original image.

Figure 20:
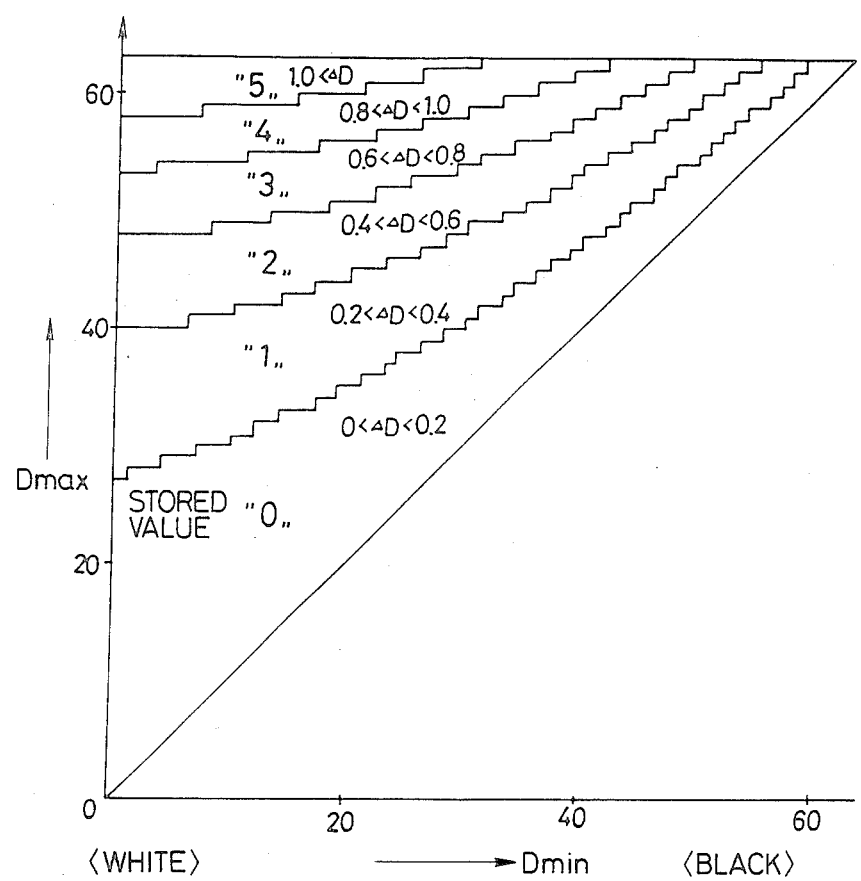
FIG. 20 is data map written in the ROM of the apparatus shown in FIG. 19.

FIG. 20 shows the contents of the ROM. Referring to FIG. 20, an area wherein "0" is written corresponds to the case wherein the difference ΔD between the maximum density Dmax and minimum density Dmin is smaller than 0.2. Similarly, an area wherein "1" is written corresponds to the case wherein the difference ΔD falls within the range between 0.2 and 0.4. Therefore, 6 different processes may be adopted in accordance with the value (0 to 5) of the output from the ROM. Furthermore, the output from the ROM may be compared with a predetermined value and then be binarized to perform a two-step process.

In this embodiment, as shown in FIG. 19, the output level from a ROM 93 is compared with a signal from a CPU 92 by a comparator 91. The signal process is selected by an MPX 90 in accordance with an output from the comparator 91. The process selection threshold level can be easily changed by sending a command to the CPU 92 by a key input from a console or a VR (volume) and sending a predetermined level of from 0 to 5 to the comparator 91.

According to another method, the ROM 87 (FIG. 16) is divided at different levels to provide a plurality of ROMs, and a desired chip is selected to provide the same effect.

According to the embodiment of the present invention, an image processing circuit is realized which can extract an image tone of an image block without correcting an image signal read by a CCD or the like, process the data from the CCD without losing data and select the binarization method suitable for the image tone. When the switching level between the binarization methods is rendered variable, a switch from the complete dither process to the complete slice binary process can be made with ease.

In the method described above, maximum and minimum densities are used to obtain an image tone. However, a parameter which allows extraction of an image tone can be used such as an average density, the number of pels exceeding a predetermined reference value, and the like.

Figure 21:
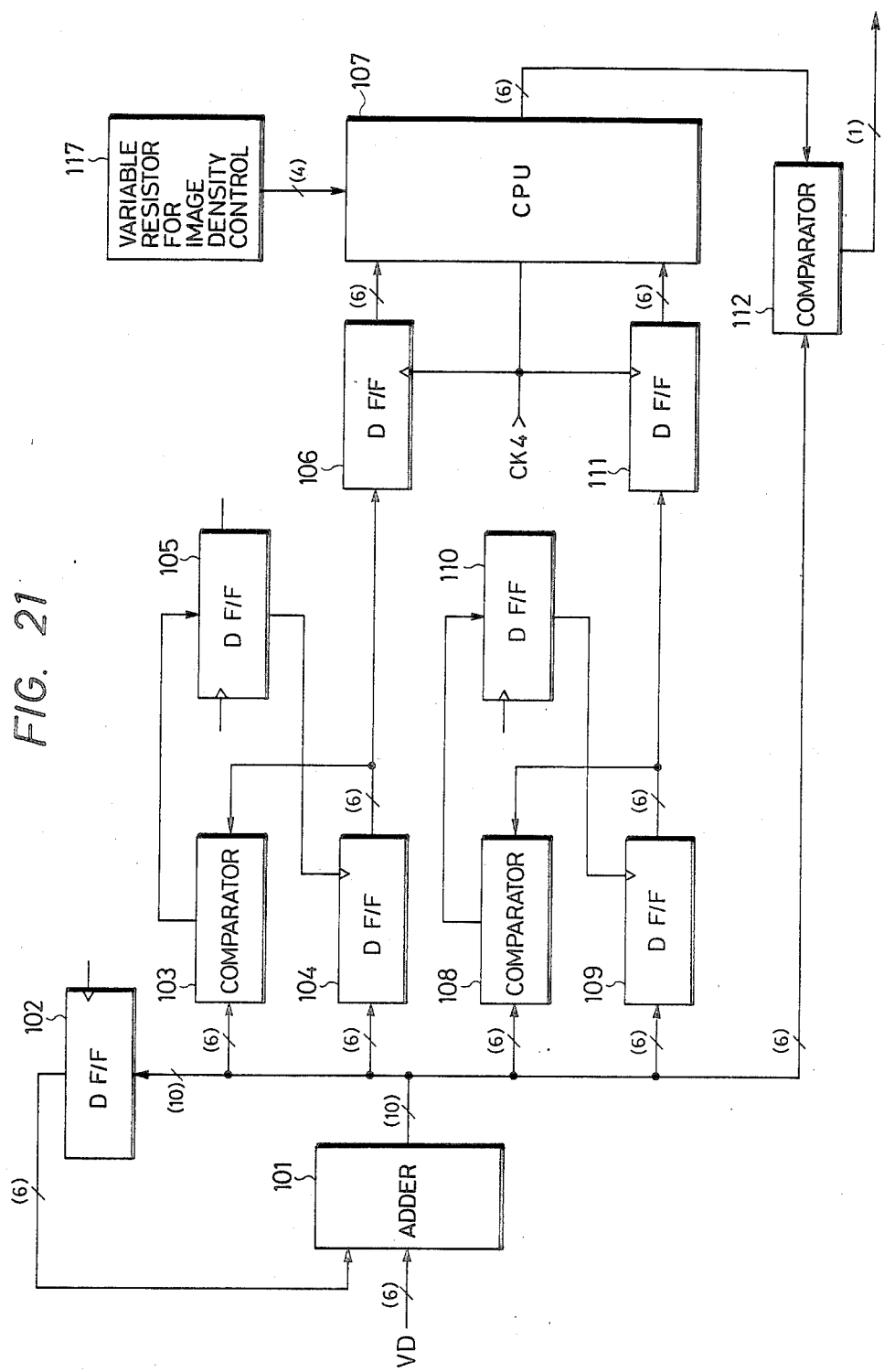
FIG. 21 is a block diagram showing an image processing apparatus according to a seventh embodiment of the present invention.

A seventh embodiment of the present invention will be described below. FIG. 21 is a block diagram of an image processing apparatus of this embodiment.

In the circuit shown in FIG. 21, an output from a 1-bit full adder 101 is temporarily held in a D F/F 102. In response to an externally supplied pel density signal transfer clock, the D F/F 102 supplies data of the addition result to the full adder 101. Since the input pel density signal VD has 6 bits, the adder can sequentially add 16 input pel density signals VD in the main scan direction. Thus, when input pel density signals VD within an effective area starting from the start pel of a main scan are added, and the upper 6 bits of the addition data are extracted upon completion of the 16 input pel density signals, an average value of the 16 pel densities is obtained.

The data of the average value of the 16 pel densities thus obtained is supplied to a comparator 103 and to a D F/F 104. An output from the D F/F 104 is supplied to the comparator 103 which compares it with the input pel density average signal. The D F/F 104 is preset such that the output becomes "0". Therefore, irrespective of the initial input pel density average value, the comparator 103 determines that the input pixel density average value is greater than the other signal. In accordance with this discrimination result, the output from the D F/F 105 is rendered at "H" level. When the output from the D F/F 105 is "H", the average data of the 16 pel densities is latched as the initial value in the D F/F 104. At the same time, the D F/F 102 of 10 bits for holding the addition result of the sequentially supplied pel density signals is cleared to "0".

When the average value of the 16 consecutive pel density signals is obtained in this manner, the comparator 103 compares the previous pel density average value latched in the D F/F 104 with the input pel density average value. Only when the current input pel density average value is greater than the previous one, the D F/Fs 105 and 104 are operated. As a result, the D F/F 104 stores a maximum value among the input pel density signals received so far.

The above operation of the pel density maximum average value detection/storage is sequentially repeated for an effective image area of pel density signals which are sequentially transferred in the main scan direction. When one main scan ends, a maximum value of 180 pel density average values obtained by dividing an image area having a width of 1/16 mm and a length of about 180 mm into unit blocks each having a size of 1/16 mm × 1 mm, that is, a pel density average value closest to black is detected.

The detection operation of the average value of the pel densities is repeatedly performed for a range of 4 main scans. When every four main scans are completed, a maximum average density DAmax within an image area of ¼ mm × 180 mm is detected by the output from the D F/F 104.

The maximum average density DAmax obtained for each four main scans is supplied to a D F/F 106 which receives a latch clock CK4 to be operated for each four main scans. Then, the D F/F 106 holds the average value for the next four main scan period. The output from the D F/F 106 is supplied to a CPU 107 which also receives the latch clock CK4 at its interrupt terminal. Therefore, when pel data is read at a rate of 400 μsec per line, the CPU 107 can fetch the maximum average density for each about 1.6 ms.

A comparator 108 and D F/Fs 109 to 111 operate in the same manner as the comparator 103 and the D F/Fs 104 to 106 to detect a minimum average density DAmin in the image area having a size of ¼ mm × 180 mm. The D F/F 109 is different from the D F/F 104 described above. The D F/F 109 is preset such that the average pel density for the first 16 pels of the main scan is latched as the initial value.

As described above, according to the configuration shown in FIG. 21, by combining a comparator and a D F/F and without using an expensive memory device, the maximum and minimum average densities within an image area in the 4 main scan period can be detected. At the same time, data fetching in the CPU can be performed at a relatively low speed of 1.6 ms. Therefore, a special CPU need not be used, and another CPU for another purpose can be commonly used.

Furthermore, in the image processing apparatus of the present invention, the average value of the pel densities for 16 pels is calculated in the main scan direction. Therefore, the adverse effect on the pel density data is prevented when a bit error occurs in the output from the image pick-up element. Since the maximum average density DAmax is detected to be small for a thin line, a data error of the pel density processed in accordance with the maximum average density is not caused. However, for the minimum average density DAmin, even if an original has a background of intermediate levels between black and white such as a diazo original, the density of the background can be detected with good precision. In this manner, image density detection for image processing can be performed at good precision.

A description will now be made of an algorithm for determining the slice level of pel density signals in the CPU in accordance with the maximum and minimum average densities DAmax and DAmin.

In general, it is considered that the slice level for pel density signal binarization is preferably selected to be ½(DAmax+DAmin). However, the values of DAmax and DAmin are those based on the image area having a size of 1/16 mm × 1 mm, and it is not always suitable to select a slice level based only on the values of DAmax and DAmin. Furthermore, as in a conventional apparatus, when a slice level is determined by prescan, if the background is discriminated by visual observation, the average value of pel densities within a relatively wide range is calculated. In the apparatus of the present application, although the basic operation is a sequential operation type, the incorporation of a CPU allows averaging of the image area for a wider range of image by adding previous data to the new pel density average data for 4 main scans.

In general, an average value $\bar{X}_N$ of N data $X_i$ is given by:

$$\overline{X_N} = (1/N) \sum_{i=1}^{N} X_i \quad (1)$$

$$= \overline{X_{N-1}} + (X_N - \overline{X_{N-1}})/N$$

The number N in the second term of the right-hand side of this relation can be a factor which determines the weighting coefficient for the Nth data $X_N$ with respect to the previous average value $X_{N-1}$. Therefore, the number N in the second term can be an integer multiple of 2 to facilitate a calculation. Based on the maximum and minimum average densities DAmax and DAmin in the nth pel block and the data of the slice level Ln for the nth pel block, the slice level Ln+1 for the (n+1)st pel block is determined.

The pel block here means an image area in the 4 main scan period.

$$Ln + 1 = (1/N) \sum_{i=n-N}^{n} (DAmax_i + DAmin_i)/2 \quad (2)$$

$$= Ln + (1/N) \{(DAmax_n + DAmin_n)/2 - Ln\}$$

In this equation, when N=32, the average value is calculated for 32 previous blocks, that is, for a range of 8 mm. Therefore, when a black stripe of about 1 m is present in the main scan direction, the influence of the stripe on the slice level is reduced, and the disturbance of the reproduced image by an abrupt change in the slice level can be reduced. When a stepped black image is generated for several centimeters, the slice level reaches a maximum threshold level at a delay of 8 mm from the image and the image can be completely reproduced in white. In view of this, the maximum and minimum average densities DAmax and DAmin supplied to the CPU must be limited. For this purpose, a calculation is performed. An example of this calculation is shown below:

When $DAmax_n < A$, $DAmax_n \rightarrow DAmax_{n-1}$

When $DAmin_n > B$, $DAmin_n \rightarrow DAmin_{n-1}$

More specifically, when the maximum average density DAmax is very close to white or when the minimum average density DAmin is very close to black, the maximum or minimum average value is not used as the data for calculating the slice level. Instead, the immediately preceding maximum and minimum average densities are held in registers and are used for the nth data.

Figure 27:
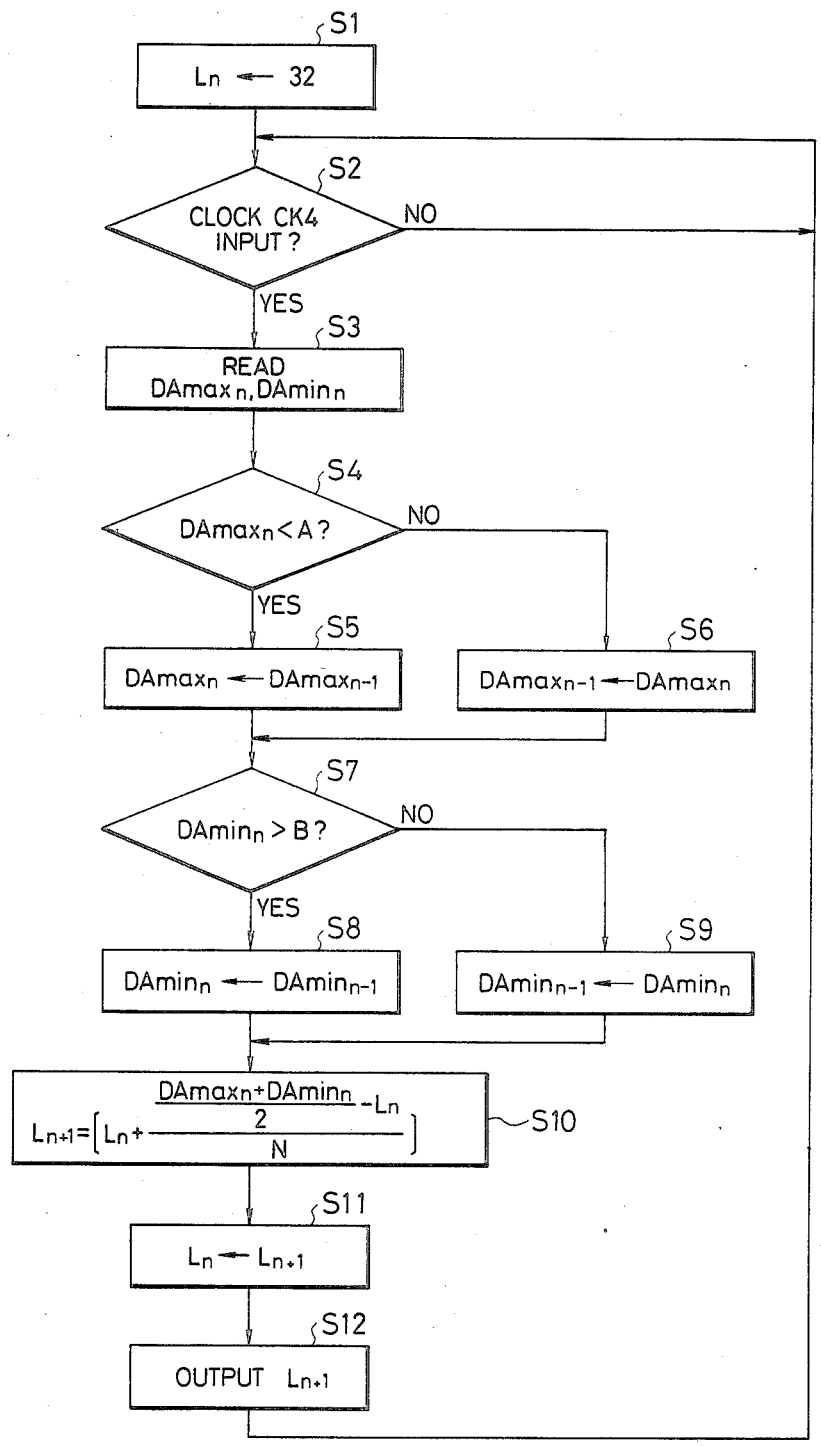
FIG. 27 is a flow chart for explaining calculations performed by a CPU 107 in the apparatus shown in FIG. 26.

FIG. 27 shows a flow chart for performing such a calculation in accordance with a program stored in the ROM in the CPU 107. The flow chart shown in FIG. 27 will now be described.

In step S1, the slice level Ln is set at 32 as an initial value. In step S2, it is discriminated if the clock CK4 is inputted. If it is determined in step S2 that the clock CK4 is received, the flow advances to step S3 wherein the maximum and minimum average densities DAmax and DAmin are read.

In steps S4, S5 and S6, it is checked if the maximum average value DAmax is smaller than a predetermined value A. If the density $DAmax_n$ is determined to be smaller than A, the immediately preceding (n−1) maximum average density $DAmax_{n-1}$ is stored as the current maximum average value in a register.

If the read maximum average density DAmax is greater than the predetermined value, the flow goes to step S6. In step S6, the read density $DAmax_n$ is stored in the register storing the immediately preceding (n−1) maximum average density.

In steps S7, S8 and S9, it is discriminated if the minimum average value $DAmin_n$ is greater than a predetermined value B. The value of each register is updated in accordance with the discrimination result.

In step S10, the slice level Ln+1 for the (n+1)st pel block is calculated in accordance with the equation (2) based on the slice level Ln for the nth pel block, $DAmax_n$, $DAmin_n$, and the number N of blocks to be considered.

In steps S11 and S12, the calculated slice level Ln+1 is shifted in a register now storing the slice level Ln, and is supplied to a comparator 112.

When A and B described above are set to be $(\frac{1}{8}) \times 64$ and $(\frac{7}{8}) \times 64$, the slice level is calculated to be $(A+B)/2 = 64/2$. Therefore, the values for DAmax and DAmin for the image portion of 8 mm at the leading end of the original can be A and B.

Figure 22:
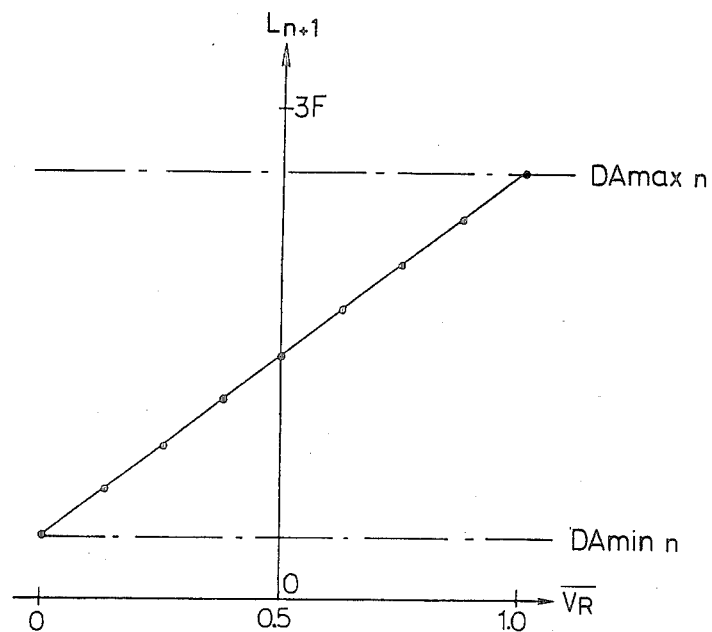
FIGS. 22 to 25 are graphs showing slice level setting for binary and three gray level processes of the image density.

A description will now be made with reference to a pel density control variable resistor arranged in a console section in an image processing apparatus of this type. In this image processing apparatus, an optimal image can be obtained without requiring a manual operation. That is, when a control lever is set at the center within a density control range, automatic control of the image density is performed in accordance with the above equation. When the control lever is set at a position other than the center of the scale, the slice level can be manually set in accordance with the set position. In other words, the following equation is established.

$$Ln+1 = [Ln + (1/N)\{(DAmax_n - DAmin_n) \times \widetilde{V}_R + DAmin_n - Ln\}] \quad \ldots (3)$$

where $\widetilde{V}_R$ is 0 to 1.0 in correspondence with the relative set position of the image density control lever, as shown in FIG. 22. When the conditions for the values A and B as described above are satisfied, even if the density control lever is set at a brightest or darkest position, the slice level will not become below A or over B. Accordingly, an optimal image reproduction can be performed even for a white or black solid image.

A variable resistor 117 for image density control shown in FIG. 21 supplies a 4-bit density preset signal to the CPU 107.

A comparator 112 shown in FIG. 21 compares the 6-bit image data of the input pel density signal with a 6-bit slice level signal from the CPU 107, thereby converting the input pel density signal into binary image data. The obtained binary image data is supplied to a printer or the like.

A description will now be made of an algorithm for calculating a slice level when a pel density signal is quantized into a multi-level signal in the image processing apparatus of this embodiment. In general, in a laser beam printer, a multi-level latent image is formed by changing the beam spot area by controlling the laser beam radiation time per pel. For example, in order to form a visualized image in a three-level printer, the beam spot for forming a one-pel image is divided into first and second halves. Thus, we obtain a case wherein the first and second halves are turned on, a case wherein neither of the first and second halves is turned on, and a case wherein only one of the first and second halves is turned on. Each pel image is reproduced in one of three levels corresponding to these cases. In this manner, the input pel density signal is converted into a three-level density signal using different threshold levels in the first and second halves of one pel.

Figure 23:
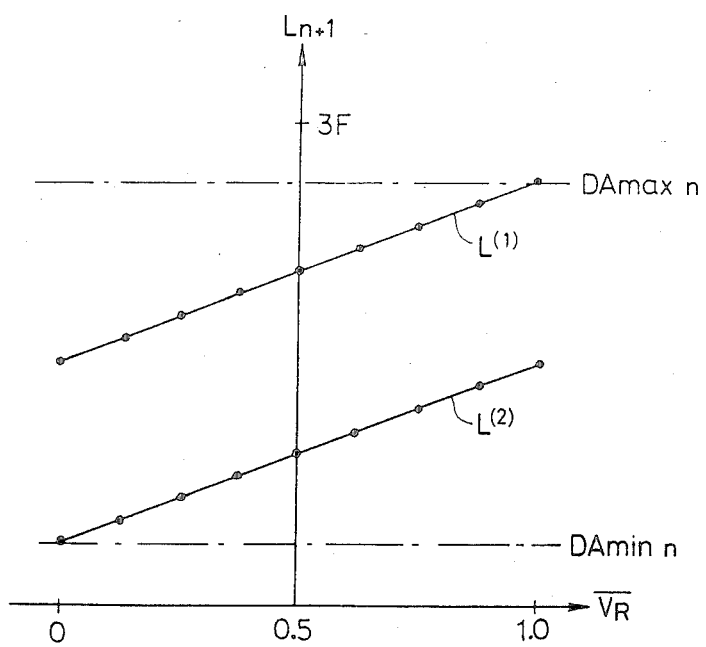

The two slice levels $L^{(1)}$ and $L^{(2)}$ used for reproducing an image with three density levels are given as follows as shown in FIG. 23:

$$L^{(1)}_{n+1} = \left[ L^{(1)}_n + \frac{1}{N}\left\{ \frac{(DA\max_n + DA\min_n) + (DA\max_n - DA\min_n)\widetilde{V}_R}{2} - L^{(1)}_n \right\} \right] \quad (4)$$

$$L^{(2)}_{n+1} = \left[ L^{(2)}_n + \frac{1}{N}\left\{ \frac{DA\max_n - DA\min_n}{2} \cdot V_R - L^{(2)}_n \right\} \right] \quad (5)$$

Figure 24:
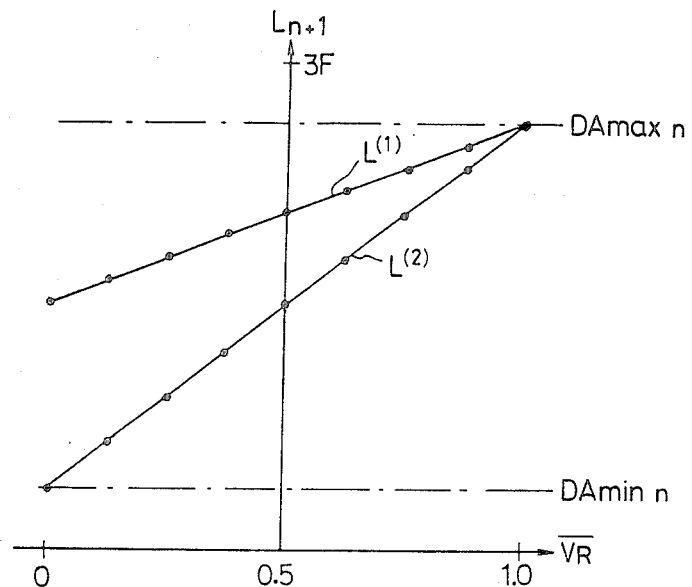
Figure 25:
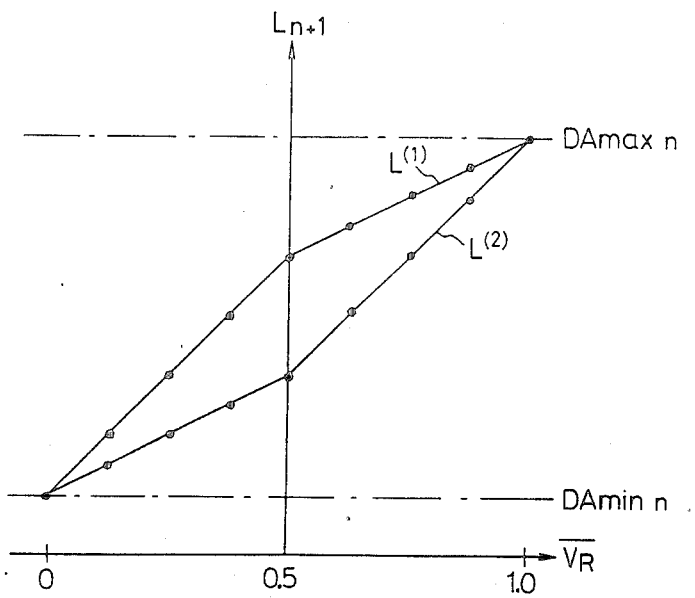

In this manner, when a pel density signal is converted into a three-level signal, two methods can be adopted. According to the first method, the two slice levels $L^{(1)}$ and $L^{(2)}$ are linearly changed with the same decrement/increment in accordance with a change in the set position of the density control lever. In accordance with the second method, as shown in FIG. 24 or 25, although the two slice levels $L^{(1)}$ and $L^{(2)}$ are changed linearly, the decrements/increments for the two levels are different from each other or between the first and second subranges of the entire density control range. The slice levels $L^{(1)}$ and $L^{(2)}$ shown in FIGS. 24 or 25 can be set in accordance with the following calculation:

FIG. 24:

$$L^{(1)}_{n+1} = \left[ L^{(1)}_n + \frac{1}{N}\left\{ \frac{(DA\max_n + DA\min_n) + (DA\max_n - DA\min_n)\widetilde{V}_R}{2} - L^{(1)}_n \right\} \right] \quad (6)$$

$$L^{(2)}_{n+1} = \left[ L^{(2)}_n + \frac{1}{N}\{(DA\max_n - DA\min_n)\widetilde{V}_R + DA\min_n - L^{(2)}_n\} \right] \quad (7)$$

FIG. 25:

When $VR \geq 0.5$ $$L^{(1)}_{n+1} = \left[ L^{(1)}_n + \frac{1}{N}\left( \frac{1}{3}(DA\max_n + DA\min_n) + \frac{2}{3}(DA\max_n - DA\min_n)\widetilde{V}_R - L^{(1)}_n \right) \right] \quad (8)$$

$$L^{(2)}_{n+1} = \left[ L^{(2)}_n + \frac{1}{N}\left( -\frac{1}{3}(DA\max_n + DA\min_n) + \frac{4}{3}(DA\max_n - DA\min_n)\widetilde{V}_R - L^{(2)}_n \right) \right] \quad (9)$$

When $VR < 0.5$ $$L^{(1)}_{n+1} = \left[ L^{(1)}_n + \frac{1}{N}\left( \frac{4}{3}(DA\max_n - DA\min_n)\widetilde{V}_R + DA\min_n - L^{(1)}_n \right) \right] \quad (10)$$

$$L^{(2)}_{n+1} = \left[ L^{(2)}_n + \frac{1}{N}\left( \frac{2}{3}(DA\max_n - DA\min_n)\widetilde{V}_R + DA\min_n - L^{(2)}_n \right) \right] \quad (11)$$

Figure 26:
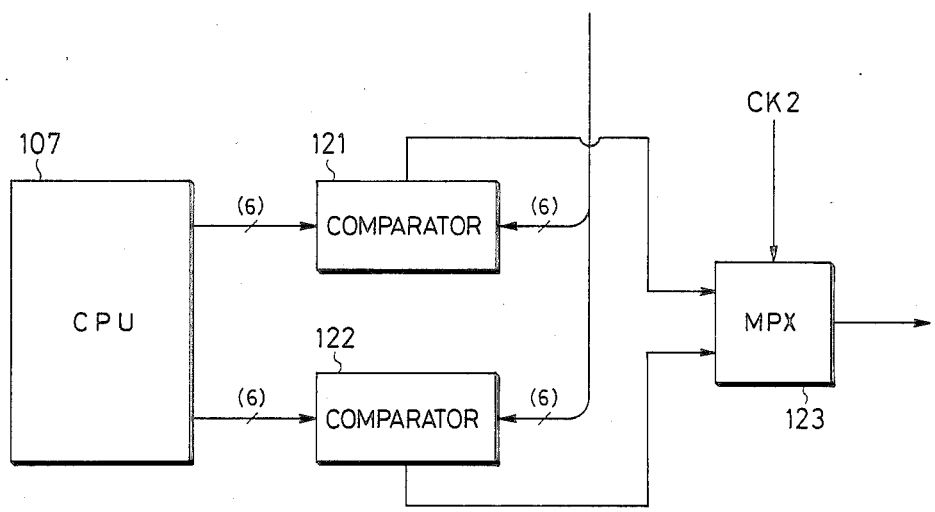
FIG. 26 is a block diagram showing a modification of the configuration shown in FIG. 21.

When the pel density signal is converted into a three-level signal in this manner, the circuit shown in FIG. 21 must be modified as shown in FIG. 26. In the circuit configuration shown in FIG. 26, the two slice levels $L^{(1)}$ and $L^{(2)}$ are set by the CPU 107 and are supplied to comparators 121 and 122 which perform binarization of the input pel density signal. The binary image data from the comparators 121 and 122 are supplied to an MPX 123. 1-bit three-level image data is obtained by alternately switching the data in accordance with a clock signal CK2 having a rate twice that of an externally supplied image data transfer clock. The obtained image data is supplied to a laser beam printer or the like.

Each slice level shown in the equations (3) to (11) can be easily obtained by reading the resistance of the variable resistor for image density control by the CPU 107 in step S10 in the flow chart shown in FIG. 27, and calculating in accordance with the equations (3) to (11).

In the embodiments described above, a comparator is used for performing a dither process or a slice binarization process. However, the dither process or the slice binarization process can be performed using a memory having input pel data as an address.

The present invention is not limited to the particular embodiments described above, and various other changes and modifications may be made within the spirit and scope of the present invention.

What I claim is:

1. An image processing apparatus comprising:
   first processing means for performing a halftone process of input image data;
   second processing means for performing a non-halftone process of the input image data; and
   means for combining image data produced from said first and second processing means, wherein said combining means has means for ORing and means for ANDing image data from said first and second processing means.

2. An image processing apparatus comprising:
   image data input means;
   first processing means for processing image data from said input means in an analog form to produce a first reproduction signal;
   second processing means for processing the image data from said input means in a digital form to produce a second reproduction signal; and
   determining means for determining a characterisstic of the image data from said input means and for selecting the first or second reproduction signal in accordance with the determination result.

3. An apparatus according to claim 2, wherein said second processing means halftone-processes the image data in a digital form to produce the second reproduction signal, and wherein said determining means determines whether the image data from said input means represents a halftone image or a non-halftone image and selects the first or second reproduction signal in accordance with the determination result.

4. An apparatus according to claim 3, wherein said first processing means binarizes the input image data on the basis of a threshold signal, said threshold signal being selected in accordance with the input image data.

5. An apparatus according to claim 3, wherein said second processing means has dither processing means for performing dither processing of the input image data in accordance with a predetermined dither matrix.

6. An apparatus according to claim 3, further comprising first delay means for delaying the first reproduction signal produced by said first processing means, and second delay means for delaying the second reproduction signal produced by said second processing means.

7. An apparatus according to claim 3, wherein said input means includes an analog to digital conversion means for converting analog image data to digital pixel data, and wherein said determining means divides the digital pixel data into a plurality of blocks, each block being composed of a plurality of digital pixel data, and determining whether each block has a halftone area or a non-halftone area.

8. An apparatus according to claim 7, wherein said determining means has storage means for storing the maximum and minimum values of the digital pixel data in each of the blocks, and determines whether each block has a halftone area or a non-halftone area on the basis of at least one of the maximum value and the minimum value.

9. An image processing apparatus comprising:
image data input means;
first processing means for halftone-processing image data from said input means to produce a first reproduction signal;
second processing means for non-halftone-processing the image data from said input means to produce a second reproduction signal; and
operating means for operating on the first and second reproduction signals to produce a combination signal.

10. An apparatus according to claim 9, wherein said first processing means comprises dither processing means for performing a dither process of the input image data.

11. An apparatus according to claim 9, wherein said second processing means comprises slice binarizing means for performing a slice binarization process of the input image data in accordance with a predetermined threshold level.

12. An apparatus according to claim 9, further comprising determining means for determining a characteristic of the input image data and for selecting the first reproduction signal or the combination signal in accordance with the determination result.

13. An apparatus according to claim 12, wherein said input means inputs pixel data having a predetermined number of bits, and wherein said determining means divides the input pixel data into a plurality of blocks and determines a characteristic of the input pixel data for each block, said block being composed of a plurality of pixel data.

14. An apparatus according to claim 12, wherein said determining means comprises a first determination circuit for determining whether the input image data represents a halftone image or a non-halftone image, and a second determination circuit for determining a density level of the input image data, and wherein said determining means selects the first reproduction signal or the combination signal in accordance with the result from said first and second determination circuits.

15. An apparatus according to claim 14, wherein when said first determining circuit determine that the input image data represents a halftone image, said determining means selects the first reproduction signal.

16. An apparatus according to claim 15, wherein said combining means has means for ORing the first and second reproduction signals and means for ANDing the first and second reproduction signals.

17. An apparatus according to claim 16, wherein when said first determination circuit determines that the input image data represents a non-halftone image and said second determination circuit determines that a density level of the input image data is high, said determining means selects the combination signal outputted from said ORing means.

18. An apparatus according to claim 16, wherein when said first determination circuit determines that the input image data represents a non-halftone image and said second determiantion circuit determines that a density level of the input image data is low, said determining means selects the combination signal outputted from said ANDing means.

19. An image processing apparatus comprising:
pixel data input means;
first processing means for processing pixel data from said input means in a first processing mode;
second processing means for processing the pixel data from said input means in a second processing mode; and
determining means for dividing the pixel data into a plurality of blocks and for determining a characteristic of an image for each block, said block being composed of a plurality of pixel data,
said determining means determining a characteristic of an image in a block under consideration on the basis of first and second parameters different in type from each other and a block in the vicinity of the block under consideration, and selecting the first processing mode or the second processing mode in accordance with the determination result, wherein each of said first and second parameters is associated with the block under consideration.

20. An apparatus according to claim 19, wherein said first processing means performs halftone processing of the input pixel data to output a first reproduction signal, and said second processing means performs non-halftone processing of the input pixel data to output a second reproduction signal, and wherein said determining means selects the first or second reproduction signal in accordance with the determination result.

21. An apparatus according to claim 20, further comprising combining means for combining the first and second reproduction signals to produce a combination signal, wherein said determining means selects any of the first reproduction signal, the second reproduction signal and the combination signal in acccordance with the determination result.

22. An apparatus according to claim 21, wherein said determining means comprises a first determination circuit for determining whether the block under consideration has a halftone area or a non-halftone area on the basis of the first parameter, and a second determination circuit for determining a density level of the block under consideration on the basis of the second parameter, said second parameter representing a density level of the block under consideration, and wherein said determining means selects any of the first reproduction signal, the second reproduction signal and the combination signal on the basis of both the result from determination by said first determination circuit and the result from determination by said second determination circuit.

23. An apparatus according to claim 22, wherein said first parameter represents a difference between the maximum value and the minimum value of pixel data in the block under consideration.

24. An image processing apparatus comprising:
  image data input means for sequentially inputting image data;
  first processing means for processing the image data from said input means without repeatedly using said image data to produce a first reproduction signal, said first reproduction signal being a pulse-width modulated signal;
  second processing means for processing the image data from said input means without repeatedly using said image data to produce a second reproduction signal; and
  determining means for determining a characteristic of the image data from said input means and for selecting between said first processing means and said second processing means in acccordance with the determination result.

25. An apparatus according to claim 24, wherein said input means inputs pixel data of predetermind bits, and wherein said determining means divides the input pixel data into a plurality of blocks, each block being composed of a plurality of pixel data, and determines whether the input pixel data has a halftone area or a non-halftone area for each block.

26. An apparatus according to claim 24, wherein said first processsing means halftone-processes the input image data to produce the pulse-width modulated signal, and said second processing means non-halftone-processes the input image data to produce the second reproduction signal, and wherein said determination means determines whether the input image data represents a halftone image or a non-halftone image and selects the pulse-width modulated signal or the second reproduction signal in accordance with the determination result.

27. An apparatus according to claim 26, wherein said first processing means performs dither processing of the input image data by utilizing a first dither matrix and a second dither matridx to produce the pulse-width modulated signal, and wherein said second processing means performs a binary coding processing of the input image data by using a threshold of a predetermined level to produce a binary signal.

28. An apparatus according to claim 27, wherein said first processing means includes first delay means for delaying a dither processed signal and said second processing means includes second delay means for delaying a binary coded signal.

29. An image processing apparatus comprising:
  image data input means;
  first processing means for processing image data from said input means in a first processing mode to produce a first reproduction signal;
  second processing means for processing the image data from said input means in a second processing mode to produce a second reproduction signal; and
  determining means comprising a table, for entering the input image data directly as an address and for determining a characteristic of the image data to produce a predetermined signal for selection of the first or second processing mode in accordance with the determination result.

30. An apparatus according to claim 29, wherein said first processing means halftone-processes the input image data, said second processing means non-halftone-processes the input image data, and said determining means determines whether said image data represents a halftone image or a non-halftone image.

31. An apparatus according to claim 29, further comprising selection means for selecting the first or second reproduction signal on the basis of the predetemined signal, wherein a selection basis of said selecting means is variable.

32. An apparatus according to claim 29, further comprising detection means for dividing the input pixel data into a plurality of blocks, each block being composed of a plurality of pixel data, and for selecting the maximum and minimum values of the pixel data for each block, wherein said input means enters pixel data of predetermined number of bits, and wherein said determining means enters the maximum and minimum values of the pixel data for each block from said detection means as address data and determines whether the image data represents a halftone image or a non-halftone image, said determining means being provided with a memory.

33. An image processing apparatus comprising:
  digital pixel data input means;
  detecting means for dividing digital pixel data from said input means into a plurality of blocks and for detecting a predetermined value for each of the blocks, each block being composed of a plurality of digital pixel data; and
  means for calculating a slice level for binarization of the next block utilizing the predetermined value of the previous block detected by said detecting means.

34. An apparatus according to claim 33, wherein said calculating means calculates the slice level for binarization of the next block in accordance with the slice level and the predetermined value of the previous block.

35. An apparatus according to claim 34, wherein said detecting means has first detecting means for dividing the input pixel data into a plurality of small blocks and for detecting an average value of a density for each of the small blocks, and second detecting means for detecting maximum and minimum values of the average values in a large block consisting of the plurality of small blocks, and wherein the predetermined value is either the maximum or minimum value.

36. An image processing apparatus comprising:
  image data input means; and
  processing means for processing image data from said input means;
  wherein said processing means includes means for detecting a peak value of said image data inputted from said input means, non-halftone process means for performing a non-halftone process for the image data to produce a first reproduction signal, halftone process means for performing a halftone process for the image data to produce a second reproduction signal, and determining means for determining a charateristic of the image data from said input means and for selecting the first or second reproduction signal in accordance with the detemrnination result, and wherein said non-halftone process means binarizes the input image data on the basis of a threshold signal, said threshold signal being selected in accordance with an output of said peak value detecting means.

37. An apparatus according to claim 36, wherein said input means includes an analog to digital conversion means for converting analog image data to digital pixel data, and wherein said determining means divides the digital pixel data into a plurality of blocks, each block being composed of a plurality of digital pixel data, and determining whether each block has a halftone area or a non-halftone area.

* * * * *